(12) United States Patent
Suzuki

(10) Patent No.: US 12,402,187 B2
(45) Date of Patent: *Aug. 26, 2025

(54) COMMUNICATION DEVICE, NON-TRANSITORY COMPUTER-READABLE RECORDING MEDIUM STORING COMPUTER-READABLE INSTRUCTIONS FOR COMMUNICATION DEVICE, AND NON-TRANSITORY COMPUTER-READABLE RECORDING MEDIUM STORING COMPUTER-READABLE INSTRUCTIONS FOR FIRST EXTERNAL DEVICE

(71) Applicant: Brother Kogyo Kabushiki Kaisha, Nagoya (JP)

(72) Inventor: Satoshi Suzuki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,901

(22) Filed: May 20, 2024

(65) Prior Publication Data
US 2024/0306232 A1 Sep. 12, 2024

Related U.S. Application Data

(63) Continuation of application No. 18/136,039, filed on Apr. 18, 2023, now Pat. No. 12,016,066, which is a
(Continued)

(30) Foreign Application Priority Data
Dec. 28, 2018 (JP) ................................. 2018-247065

(51) Int. Cl.
*H04W 76/14* (2018.01)
*H04W 4/80* (2018.01)
(Continued)

(52) U.S. Cl.
CPC ............. *H04W 76/14* (2018.02); *H04W 4/80* (2018.02); *H04W 8/005* (2013.01); *H04W 12/04* (2013.01); *H04L 9/0841* (2013.01)

(58) Field of Classification Search
CPC ....... H04W 76/14; H04W 4/80; H04W 8/005; H04W 12/04; H04W 12/50; H04W 84/12;
(Continued)

(56) References Cited

U.S. PATENT DOCUMENTS 9,015,329 B2  4/2015  Chang et al.
9,397,989 B1  7/2016  Ramalingam et al.
(Continued)

FOREIGN PATENT DOCUMENTS

CN  105227801 A  1/2016
CN  105307166 A  2/2016
(Continued)

OTHER PUBLICATIONS

Wi-Fi Alliance, "Device Provisioning Protocol Specification", Version 1.0, pp. 1-124, Apr. 2018.
(Continued)

*Primary Examiner* — Eugene Yun
(74) *Attorney, Agent, or Firm* — Banner & Witcoff, Ltd.

(57) ABSTRACT

A communication device may supply a first public key and specific information to a first wireless interface, send a first authentication response to the first external device in a case where a first authentication request is received from the first external device after the first public key and the specific information have been sent to the first external device. The communication device may receive first connection information from the first external device after the first authentication response has been sent to the first external device, establish the second wireless connection in a case where the first connection information is received from the first exter-
(Continued)

nal device, and establish the third wireless connection in a case where a specific signal including the specific information is received from the first external device after the first public key and the specific information have been sent to the first external device.

6 Claims, 13 Drawing Sheets

Related U.S. Application Data continuation of application No. 17/807,178, filed on Jun. 16, 2022, now Pat. No. 11,647,552, which is a continuation of application No. 17/326,961, filed on May 21, 2021, now Pat. No. 11,399,399, which is a continuation of application No. 16/727,568, filed on Dec. 26, 2019, now Pat. No. 11,044,770.

(51) Int. Cl.
*H04W 8/00* (2009.01)
*H04W 12/04* (2021.01)
*H04L 9/08* (2006.01)

(58) Field of Classification Search
CPC ..... H04W 12/06; H04W 12/02; H04W 12/03; H04W 76/15; H04L 9/0841; H04L 9/3273; H04L 9/3236; H04L 9/3252; H04L 2209/80; G06F 21/608
USPC ........................................................ 455/41.1
See application file for complete search history.

(56) References Cited

U.S. PATENT DOCUMENTS

| | | | |
|---|---|---|---|
| 10,169,587 | B1 | 1/2019 | Nix |
| 10,434,988 | B2 | 10/2019 | Gennermann et al. |
| 11,044,770 | B2 | 6/2021 | Suzuki |
| 11,109,228 | B2 * | 8/2021 | Suzuki .............. H04W 12/0431 |
| 11,399,399 | B2 | 7/2022 | Suzuki |
| 2002/0126780 | A1 | 9/2002 | Oshima et al. |
| 2004/0066756 | A1 | 4/2004 | Ahmavaara et al. |
| 2007/0109262 | A1 | 5/2007 | Oshima et al. |
| 2008/0158597 | A1 | 7/2008 | Hashimoto et al. |
| 2009/0028049 | A1 | 1/2009 | Boudreau et al. |
| 2011/0215921 | A1 | 9/2011 | Ben Ayed et al. |
| 2013/0196702 | A1 | 8/2013 | Shibata |
| 2015/0229475 | A1 | 8/2015 | Benoit et al. |
| 2016/0004498 | A1 | 1/2016 | Iwauchi |
| 2016/0156790 | A1 | 6/2016 | Iwauchi |
| 2016/0286021 | A1 | 9/2016 | Takeuchi |
| 2016/0294819 | A1 | 10/2016 | Salmela et al. |
| 2017/0026833 | A1 | 1/2017 | Goto |
| 2017/0048705 | A1 | 2/2017 | Fujita |
| 2017/0078839 | A1 | 3/2017 | Dong |
| 2017/0142086 | A1 | 5/2017 | Chen et al. |
| 2017/0156172 | A1 | 6/2017 | Yokoyama et al. |
| 2017/0156174 | A1 | 6/2017 | Chaponniere et al. |
| 2017/0228203 | A1 | 8/2017 | Iwauchi |
| 2017/0244703 | A1 | 8/2017 | Lee et al. |
| 2018/0060000 | A1 | 3/2018 | Iwauchi |
| 2018/0069718 | A1 | 3/2018 | Terao |
| 2018/0069726 | A1 | 3/2018 | Ohhira et al. |
| 2018/0069851 | A1 | 3/2018 | Terao |
| 2018/0077318 | A1 | 3/2018 | Gusmano |
| 2018/0084098 | A1 | 3/2018 | Takeuchi |
| 2018/0109418 | A1 | 4/2018 | Cammarota et al. |
| 2018/0181355 | A1 | 6/2018 | Suzuki et al. |
| 2018/0184485 | A1 | 6/2018 | Shibata et al. |
| 2018/0219845 | A1 | 8/2018 | Sumiuchi et al. |
| 2019/0022688 | A1 | 1/2019 | Zhang |
| 2019/0110204 | A1 | 4/2019 | Goto |
| 2019/0215878 | A1 | 7/2019 | Goto |
| 2019/0245840 | A1 | 8/2019 | Chen et al. |
| 2019/0294393 | A1 | 9/2019 | Iwauchi |
| 2019/0320317 | A1 | 10/2019 | Sakai |
| 2020/0007674 | A1 | 1/2020 | Takeuchi |
| 2021/0297523 | A1 | 9/2021 | Takeuchi |
| 2022/0015161 | A1 | 1/2022 | Goto |

FOREIGN PATENT DOCUMENTS

| | | |
|---|---|---|
| CN | 106454822 A | 2/2017 |
| CN | 107925658 A | 4/2018 |
| CN | 108259694 A | 7/2018 |
| CN | 108377313 A | 8/2018 |
| CN | 110198539 A | 9/2019 |
| EP | 2456245 A1 | 5/2012 |
| JP | 2002-271281 A | 9/2002 |
| JP | 2016-187088 A | 10/2016 |
| JP | 2016-187090 A | 10/2016 |
| JP | 2017-011764 A | 1/2017 |
| JP | 2017-028454 A | 2/2017 |
| JP | 2017-098901 A | 6/2017 |
| JP | 2017-152927 A | 8/2017 |
| JP | 2018006983 A | 1/2018 |
| JP | 2018-37978 A | 3/2018 |
| JP | 2018-042058 A | 3/2018 |

OTHER PUBLICATIONS

Wi-Fi Alliance Technical Committee P2P Task Group, "Wi-Fi Peer-to Peer (P2P) Technical Specification", Version 1.1, pp. 1-159, 2010.
Mar. 9, 2020—(EP) Extended Search Report—App 19219467.8.
Oct. 18, 2013—(CN) Office Action—CN App 201911374634.2, Eng Tran.
May 4, 2021—(US) Notice of Allowance—U.S. Appl. No. 16/360,492.
Feb. 22, 2022—(JP) Notification of Reason for Rejection—App 2018-068821.
Wi-Fi Alliance: "Device Provisioning Protocol Specification", Wi-Fi Alliance, Apr. 1, 2018 (Apr. 1, 2018), pp. 1-124, XP055670685.
Feb. 5, 2021—(EP) Extended Search Report—App 20198313.7.
Mar. 28, 2022—(US) Office Action—U.S. Appl. No. 17/032,532.
U.S. Appl. No. 17/032,532 Specification and Drawings as filed Sep. 25, 2020, 38 pages.
Sep. 16, 2022—(US) Notice of Allowance—U.S. Appl. No. 17/387,216.
Oct. 20, 2022—(US) Non-Final Office Action—U.S. Appl. No. 17/032,532.
Aug. 8, 2023—(JP) Notice of Reasons for Refusal—App 2019-177989.
Nov. 13, 2023—(CN) First Office Action—App 202011027058.7.
Feb. 23, 2024—(US)—Notice of Allowance—U.S. Appl. No. 18/149,816.
Wi-Fi Alliance, "DRAFT Device Provisioning Protocol Technical Specification", Version 0.2.11, pp. 1-133, Dec. 2017.

* cited by examiner

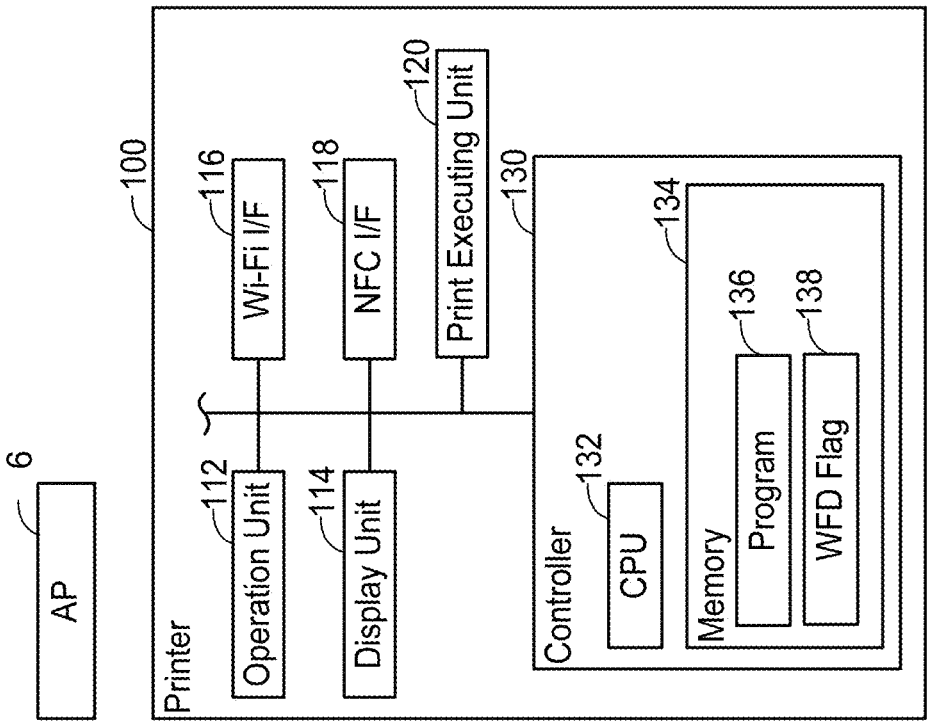
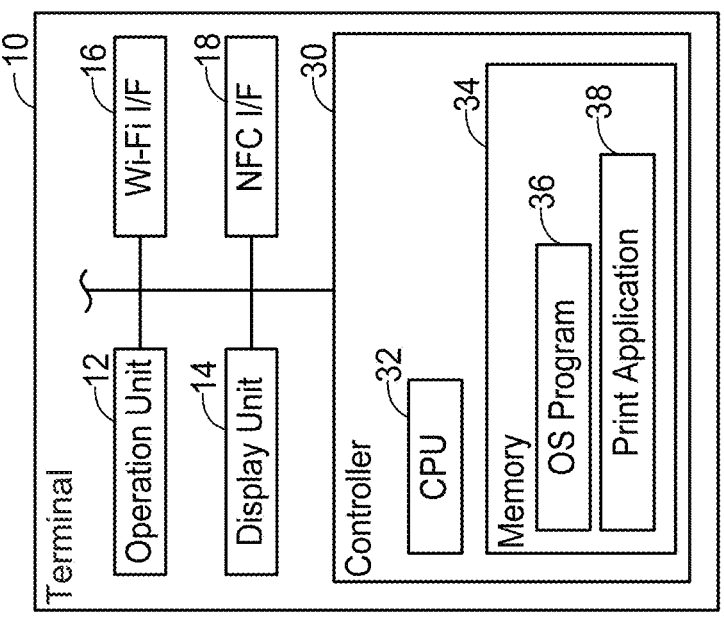
FIG. 1

FIG. 7 (First Embodiment: Case B)

(Second Embodiment)

COMMUNICATION DEVICE, NON-TRANSITORY COMPUTER-READABLE RECORDING MEDIUM STORING COMPUTER-READABLE INSTRUCTIONS FOR COMMUNICATION DEVICE, AND NON-TRANSITORY COMPUTER-READABLE RECORDING MEDIUM STORING COMPUTER-READABLE INSTRUCTIONS FOR FIRST EXTERNAL DEVICE

CROSS-REFERENCE TO RELATED APPLICATION

This application is a Continuation of U.S. application Ser. No. 18/136,039, filed on Apr. 18, 2023, which is a Continuation of U.S. application Ser. No. 17/807,178, filed on Jun. 16, 2022, now U.S. Pat. No. 11,647,552, issued May 9, 2023, which is a Continuation of U.S. application Ser. No. 17/326,961, filed on May 21, 2021, now U.S. Pat. No. 11,399,399, issued Jul. 26, 2022, which is a Continuation of U.S. application Ser. No. 16/727,568, filed on Dec. 26, 2019, now U.S. Pat. No. 11,044,770, issued Jun. 22, 2021, which claims priority to Japanese Patent Application No. 2018-247065, filed on Dec. 28, 2018, the entire contents of which are hereby incorporated by reference into the present application.

TECHNICAL FIELD

The disclosure herein discloses a technique for establishing a wireless connection between a communication device and an external device.

BACKGROUND ART

DPP (Device Provisioning Protocol) scheme, which is a connection scheme developed by the Wi-Fi Alliance, is described in "Device Provisioning Protocol Specification Version 1.0". In the DPP scheme, for example, a wireless communication according to the DPP scheme is executed in response to establishment of an NFC connection between a first device and a second device.

SUMMARY

In response to the establishment of an NFC connection between the first device and the second device, there are a situation where wireless communication according to the DPP scheme is to be executed, and a situation where wireless communication according to a connection scheme different from the DPP scheme is to be executed.

The disclosure herein discloses a technique whereby, in response to the establishment of a wireless connection between a communication device and an external device, the communication device establishes a wireless connection different from the aforementioned wireless connection according to an appropriate connection scheme among a plurality of connection schemes.

The disclosure herein discloses a communication device. The communication device may comprise: a first wireless interface; one or more wireless interfaces different from the first wireless interface; a processor; and a memory storing computer-readable instructions therein, the computer-readable instructions, when executed by the processor, causing the communication device to: establish a first wireless connection with a first external device via the first wireless interface; and supply a first public key that is a public key of the communication device and specific information to the first wireless interface, the first public key and the specific information being sent to the first external device by using the first wireless connection via the first wireless interface; in a case where a first authentication request in which the first public key is used is received from the first external device via a second wireless interface among the one or more wireless interfaces after the first public key and the specific information have been sent to the first external device: send a first authentication response that is a response to the first authentication request to the first external device via the second wireless interface; receive first connection information from the first external device via the second wireless interface after the first authentication response has been sent to the first external device, the first connection information being for establishing a second wireless connection between the communication device and a second external device via the second wireless interface; and in a case where the first connection information is received from the first external device, establish, according to a first connection scheme, the second wireless connection between the communication device and the second external device via the second wireless interface by using the first connection information; and in a case where a specific signal including the specific information is received from the first external device via a third wireless interface among the one or more wireless interfaces after the first public key and the specific information have been sent to the first external device, establish, according to a second connection scheme different from the first connection scheme, a third wireless connection between the communication device and the first external device via the third wireless interface.

A computer program for implementing the above communication device, and a computer-readable medium storing the computer program are also novel and useful. Moreover, a method carried out by the communication device is also novel and useful.

The disclosure further discloses a non-transitory computer-readable recording medium storing computer-readable instructions for a first external device. The first external device may comprise a first wireless interface and one or more wireless interfaces different from the first wireless interface, and the computer-readable instructions, when executed by a processor of the first external device, may cause the first external device to: establish a first wireless connection with a communication device via the first wireless interface; receive a public key of the communication device and specific information from the communication device by using the first wireless connection via the first wireless interface; in a case where the public key and the specific information are received from the communication device, determine which of a second wireless connection and a third wireless connection is to be established; in a case where it is determined that the second wireless connection is to be established: send an authentication request in which the public key is used to the communication device via a second wireless interface among the one or more wireless interfaces; in a case where the authentication request is sent to the communication device, receive an authentication response that is a response to the authentication request from the communication device via the second wireless interface; and in a case where the authentication response is received from the communication device, send connection information to the communication device via the second wireless interface, the connection information being for establishing the second wireless connection according to a first connection scheme between the communication device and the second external device, wherein in the communication device, the second wireless connection is established between the communication device and the second external device by using the connection information in a case where the connection information is received from the first external device; and in a case where it is determined that the third wireless connection is to be established: send a specific signal including the specific information to the communication device via a third wireless interface among the one or more wireless interfaces; and establish, according to a second connection scheme different from the first connection scheme, the third wireless connection via the third wireless interface between the communication device and the first external device after the specific signal has been sent to the communication device.

A computer-readable medium storing the above computer program is also novel and useful. Further, the first external device itself, and a method carried out by the first external device are also novel and useful.

BRIEF DESCRIPTION OF THE DRAWINGS

FIG. 1 shows a configuration of a communication system.

EMBODIMENTS (Configuration of Communication System 2; FIG. 1)

As shown in FIG. 1, a communication system 2 comprises an access point (hereinbelow termed simply as "AP") 6, a terminal 10, and a printer 100. In this embodiment, a situation is assumed in which a user uses the terminal 10 to establish a wireless connection according to the Wi-Fi scheme (hereinbelow termed as "Wi-Fi connection") between the printer 100 and the AP 6.

(Configuration of Terminal 10)

Figure 2:
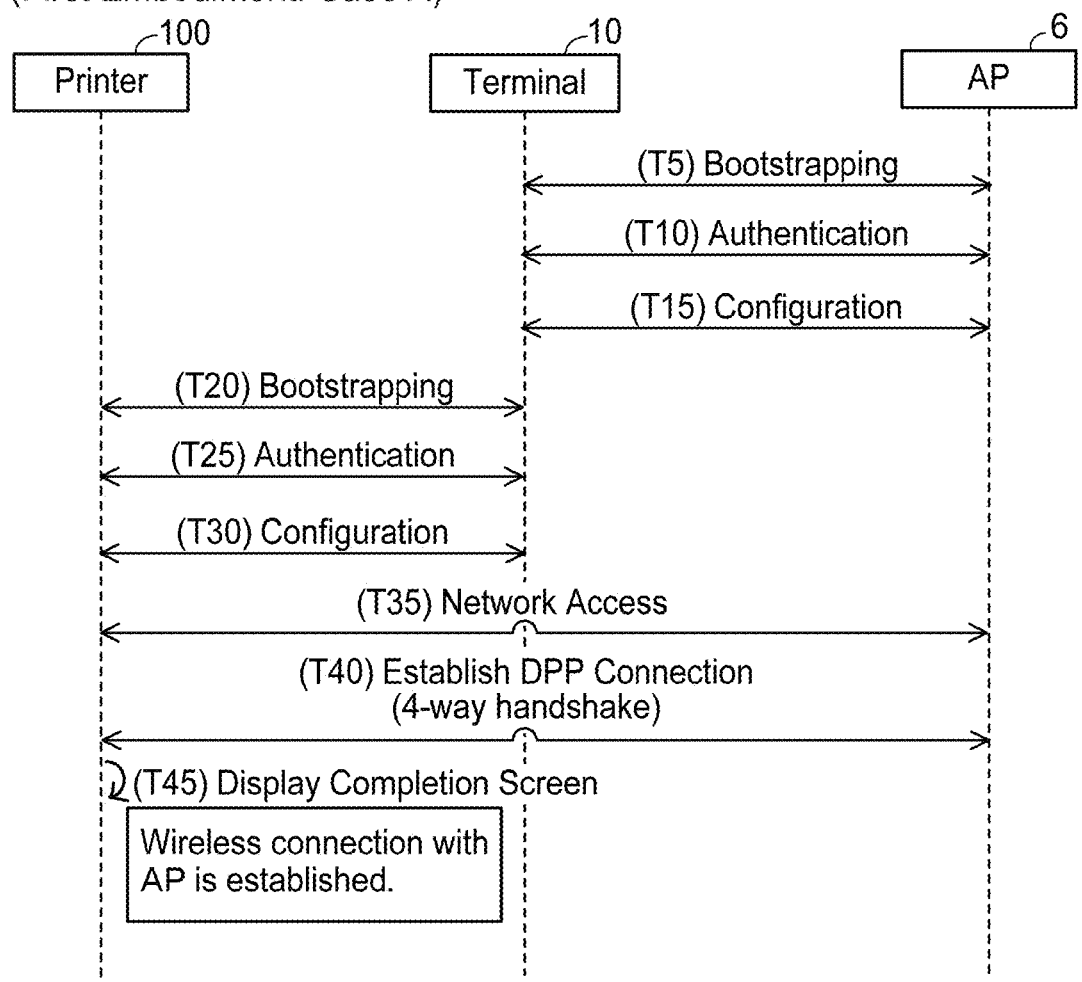
FIG. 2 shows an explanatory diagram for explaining an outline of Case A in which a Wi-Fi connection according to DPP scheme is established between a printer and an access point.

The terminal 10 is a portable terminal device such as a cellphone (e.g., a smartphone), a PDA, and a tablet PC. In a variant, the terminal 10 may be a desktop PC, a laptop PC or the like. The terminal 10 comprises an operation unit 12, a display unit 14, a Wi-Fi interface 16, an NFC interface 18, and a controller 30. The units 12 to 30 are connected to a bus line (reference number omitted). Hereinbelow, interface is termed simply as "I/F".

The operation unit 12 comprises a plurality of keys. The user can input various instructions to the terminal 10 by operating the operation unit 12. The display unit 14 is a display for displaying various information.

The Wi-Fi I/F 16 is a wireless interface configured to execute a Wi-Fi communication according to the Wi-Fi scheme. The Wi-Fi scheme is a wireless communication scheme for executing wireless communication according to, for example, 802.11 standard of IEEE (The Institute of Electrical and Electronics Engineers, Inc.) and standards complying thereto (such as 802.11a, 11b, 11g, 11n, etc.). The Wi-Fi I/F 16 can establish a Wi-Fi connection with the AP 6 in a case where an SSID (Service Set Identifier) for identifying a wireless network in which the AP 6 operates as a parent station, and a password used in that wireless network are input via the operation unit 12. Further, even if this information is not input via the operation unit 12, the Wi-Fi I/F 16 can establish a Wi-Fi connection with the AP 6 by using a so-called PIN code scheme or PBC (Push Button Configuration) scheme. Hereinbelow, a Wi-Fi connection established in this manner may be termed "normal Wi-Fi connection".

Further, the Wi-Fi I/F 16 supports the WFD (Wi-Fi Direct (registered trademark)) scheme that has been formulated by the Wi-Fi Alliance, and the DPP (Device Provisioning Protocol) scheme that has been formulated by the Wi-Fi Alliance. The WFD scheme is a connection scheme described in the standard "Wi-Fi Peer-to-Peer (P2P) Technical Specification Version1.1" created by the Wi-Fi Alliance. In the WFD standard, three states are defined as states of a WFD device: Group Owner state (hereinbelow termed "G/O state"), client state, and device state. The WFD device is capable of selectively operating in one of the above three states. The DPP scheme is described in the standard "Device Provisioning Protocol Specification Version 1.0" created by the Wi-Fi Alliance, and is a connection scheme for easily establishing a Wi-Fi connection between a pair of devices (such as the printer 100 and the AP 6) by using the terminal 10. Hereinbelow, a Wi-Fi connection established according to the DPP scheme may be termed "DPP connection", and a Wi-Fi connection established according to the WFD scheme may be termed "WFD connection".

The NFC I/F 18 is an I/F for executing NFC communication according to the NFC scheme. The NFC scheme is a wireless communication scheme based on, e.g. international standards ISO/IEC 14443, 15693, 18092, etc. I/Fs called NFC Forum Devices, and I/Fs called NFC Forum Tags are known as types of I/F for executing NFC communication. In this embodiment, the NFC I/F 18 is an NFC Forum Device.

Here, differences between the Wi-Fi I/F and the NFC I/F will be described. A communication speed of a wireless communication via a Wi-Fi I/F (e.g., maximum communication speed is 11 to 600 Mbps) is faster than a communication speed of a wireless communication via an NFC I/F (e.g., maximum communication speed is 100 to 424 Kbps). Further, a frequency used in wireless communication via a Wi-Fi I/F (e.g. a 2.4 GHz band or 5.0 GHz band) is different from a frequency used in wireless communication via an NFC I/F (e.g. a 13.56 MHz band). Further, a maximum distance at which wireless communication via a Wi-Fi I/F can be executed (e.g., about 100 m at maximum) is greater than a maximum distance at which wireless communication via an NFC I/F can be executed (e.g., about 10 cm at maximum).

The controller 30 comprises a CPU 32 and a memory 34. The CPU 32 executes various processes in accordance with an OS (Operating System) program 36 stored in the memory 34. The memory 34 is configured by a volatile memory, a non-volatile memory, or the like. Further, the memory 34 stores a print application 38 (hereinbelow simply termed "app 38"). The app 38 is a program for causing the printer 100 to execute printing, and is installed on the terminal 10 from, for example, a server on the Internet provided by a vendor of the printer 100.

(Configuration of Printer 100)

The printer 100 is a peripheral device (e.g., a peripheral device of the terminal 10, etc.) capable of executing a print function. The printer 100 comprises an operation unit 112, a display unit 114, a Wi-Fi I/F 116, an NFC I/F 118, a print executing unit 120, and a controller 130. The units 112 to 130 are connected to a bus line (reference number omitted).

The operation unit 112 comprises a plurality of keys. The user can input various instructions to the printer 100 by operating the operation unit 112. The display unit 114 is a display for displaying various information. The print executing unit 120 comprises printing mechanism such as an ink jet scheme, laser scheme, etc.

The Wi-Fi I/F 116 is identical to the Wi-Fi I/F 16 of the terminal 10. That is, the Wi-Fi I/F 116 supports the WFD scheme and the DPP scheme. For this reason, the printer 100 can establish a Wi-Fi connection with the AP 6 according to the DPP scheme (that is, a DPP connection), and can further establish a Wi-Fi connection with the terminal 10 according to the WFD scheme (that is, a WFD connection). The printer 100 can also establish a normal Wi-Fi connection with the AP 6.

The controller 130 comprises a CPU 132 and a memory 134. The CPU 132 executes various processes in accordance with a program 136 stored in the memory 134. The memory 134 is configured by a volatile memory, a non-volatile memory, or the like.

The memory 134 further stores a WFD flag 138. The WFD flag 138 indicates either a value "ON", meaning that the printer 100 is in a state of being capable of operating according to the WFD scheme, or "OFF", meaning that the printer 100 is in a state of being incapable of operating according to the WFD scheme. The state in which the WFD flag 138 is "ON" means that the operation state of the printer 100 is one of the three states (that is, G/O state, client state, and device state) of the WFD scheme. The state in which the WFD flag 138 is "OFF" means that the operation state of the printer 100 is not any of the three states of the WFD scheme.

Specific Examples; FIG. 2 to FIG. 9

Next, specific examples of processes executed by each of the devices 6, 10, 100 will be described with reference to FIGS. 2 to 9. Firstly, a process of Case A in which a DPP connection between the printer 100 and the AP 6 is established will be described with reference to FIGS. 2 to 6.

Overview of Case A; FIG. 2

Firstly, an overview of the Case A will be described with reference to FIG. 2. As aforementioned, the terminal 10 and the printer 100 support the DPP scheme, and further the AP 6 also supports the DPP scheme. In this embodiment, the DPP connection between the printer 100 and the AP 6 is established by each of the devices 6, 10, 100 executing communication according to the DPP scheme. Hereinbelow, to facilitate understanding, operations which CPUs (such as the CPUs 32, 132) of the respective devices execute will be described with the devices (such as the terminal 10, the printer 100) as subjects of action instead of describing the operations with the CPUs as the subjects of action.

In T5, the terminal 10 executes Bootstrapping (hereinbelow termed simply as "BS") according to the DPP scheme with the AP 6. This BS is a process of providing information that is to be used in Authentication (hereinbelow termed simply as "Auth") of T10 (to be described later) from the AP 6 to the terminal 10 in response to a QR code (registered trademark) attached to the AP 6 being captured by the terminal 10.

In T10, the terminal 10 executes Auth according to the DPP scheme with the AP 6 by using the information obtained in the BS of T5. This Auth is a process for each of the terminal 10 and the AP 6 to authenticate their communication counterpart.

In T15, the terminal 10 executes Configuration (hereinbelow termed simply as "Config") according to the DPP scheme with the AP 6. This Config is a process of sending information for establishing the DPP connection between the printer 100 and the AP 6 to the AP 6. Specifically, in the Config, the terminal 10 creates a Configuration Object (hereinbelow, Configuration Object is simply be termed "CO") for AP for establishing the DPP connection between the printer 100 and the AP 6, and sends the CO for AP to the AP 6. As a result, the CO for AP is stored in the AP 6.

Next, the terminal 10 executes BS according to the DPP scheme with the printer 100 in T20. This BS is a process of providing information that is to be used in Auth of T25 (to be described later) from the printer 100 to the terminal 10 by using the NFC connection established between the NFC I/F 18 of the terminal 10 and the NFC I/F 118 of the printer 100.

In T25, the terminal 10 executes Auth according to the DPP scheme with the printer 100 by using the information obtained in the BS of T20. This Auth is a process for each of the terminal 10 and the printer 100 to authenticate their communication counterpart.

In T30, the terminal 10 executes Config according to the DPP scheme with the printer 100. This Config is a process of sending information for establishing the DPP connection between the printer 100 and the AP 6 to the printer 100. In this Config, the terminal 10 creates a CO for printer for establishing the DPP connection between the printer 100 and the AP 6, and sends the CO for printer to the printer 100. As a result, the CO for printer is stored in the printer 100.

In T35, the printer 100 and the AP 6 use the stored Cos for AP and for printer to execute Network Access (hereinbelow termed simply as "NA") according to the DPP scheme. The NA is a process of sharing a connection key for establishing the DPP connection between the printer 100 and the AP 6.

In T40, the printer 100 and the AP 6 execute 4 way-handshake communication. In at least a part of the 4 way-handshake communication, the printer 100 and the AP 6 communicate encrypted information encrypted by the connection key that has been already shared in the NA in T35. Further, in a case where decryption of the encrypted information succeeds, the DPP connection is established between the printer 100 and the AP 6. Due to this, the printer 100 can participate, as a child station, in a wireless network formed by the AP 6, as a result of which the printer 100 can execute communication via the AP 6 with other device(s) participating in the wireless network. In a variant, the printer 100 and the AP 6 may execute Simultaneous Authentication of Equals (SAE, also called "Dragonfly") communication, instead of the 4 way-handshake communication.

In T45, the printer 100 causes the display unit 114 to display a completion screen indicating that the DPP connection has been established with the AP 6. When the process of T45 is completed, the process of FIG. 2 is terminated.

In the DPP scheme, in order to establish the Wi-Fi connection between the printer 100 and the AP 6, the user does not need to input information of the wireless network in which the AP 6 operates as a parent station (such as an SSID and a password) to the printer 100. As such, the user can easily establish the Wi-Fi connection between the printer 100 and the AP 6.

(Description on Respective Processes; FIGS. 3 to 6)

Next, details of the respective processes executed in T20 to T35 of FIG. 2 will be described with reference to FIGS. 3 to 9. Since the processes of T5 to T15 are similar to the processes of T20 to T30 except that the AP 6 is used instead of the printer 100, the detailed description thereof will be omitted.

Figure 3:
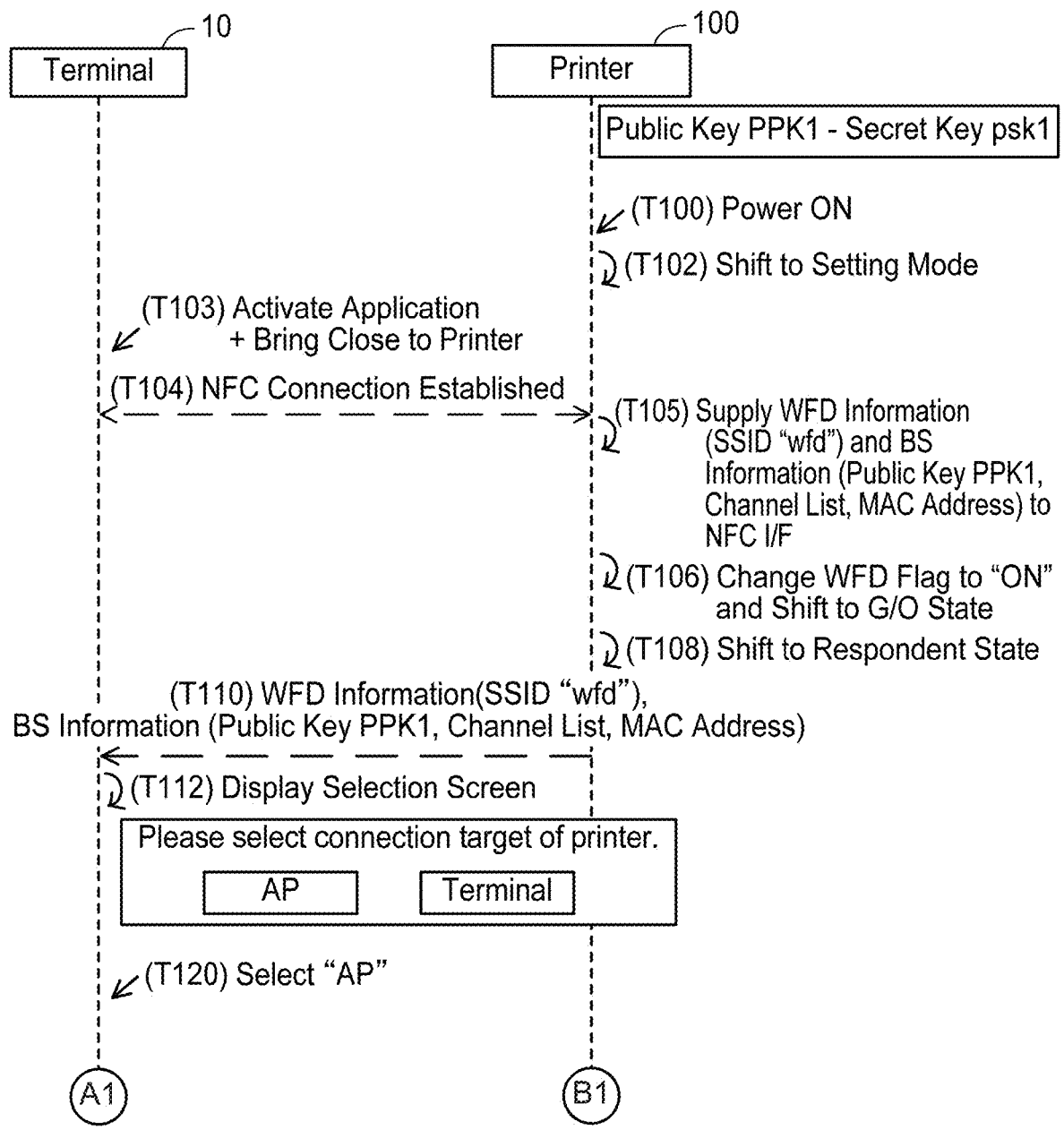
FIG. 3 shows a sequence view of a process of Bootstrapping.

(Bootstrapping (BS); FIG. 3)

First, the process of BS of T20 of FIG. 2 will be described with reference to FIG. 3. In an initial state of FIG. 3, the memory 134 of the printer 100 stores the public key PPK1 and the secret key psk1 of the printer 100 in advance. Further, in the initial state of FIG. 3, the WFD flag 138 of the printer 100 indicates "OFF".

In response to accepting a power ON operation from the user in T100, the printer 100 determines in T102 that a normal Wi-Fi connection with the AP 6 has not been established, and shifts an operation mode of the printer 100 from non-setting mode to setting mode. The printer 100 determines that a normal Wi-Fi connection with the AP 6 has not been established in a case where AP information (for example, SSID, password, etc.) for establishing the normal Wi-Fi connection with the AP 6 is not stored in the memory 134, or in a case where a confirmation signal for confirming whether a normal Wi-Fi connection has been established is sent via the Wi-Fi I/F 116 and a response to this confirmation signal is not received from the AP 6. The non-setting mode is a mode in which BS information used for establishing a DPP connection between the printer 100 and the AP 6 is not supplied to the NFC I/F 118 in response to the establishment of the NFC connection. The setting mode is a mode in which the BS information is supplied to the NFC I/F 118 in response to the establishment of the NFC connection. In other words, the non-setting mode is a mode in which a DPP connection scheme cannot be established according to the DPP, and the setting mode is a mode in which a DPP connection can be established according to the DPP scheme.

In response to the app 38 of the terminal 10 being activated, and the terminal 10 being brought close to the printer 100 by the user in T103, an NFC connection is established between the NFC I/F 18 of the terminal 10 and the NFC I/F 118 of the printer 100 in T104. In this case, in T105 the printer 100 obtains a signal indicating that the NFC connection has been established from the NFC I/F 118, determines that the operation mode of the printer 100 is the setting mode, and supplies WFD information and the BS information to the NFC I/F 118. The WFD information is information used for establishing a WFD connection between the terminal 10 and the printer 100, and includes an SSID "wfd". The SSID "wfd" is information for identifying wireless network in which the printer 100 operating in the G/O state operates as a parent station. The SSID "wfd" may be stored in advance in the memory 134, or may be created by the printer 100 in response to the establishment of the NFC connection. The BS information includes the public key PPK1 of the printer 100 stored in the memory 134, a channel list stored in advance in the memory 134, and a MAC address of the printer 100. The channel list is information indicating a plurality of communication channels determined in advance in the printer 100 (that is, a plurality of communication channels that can be used by the printer 100).

In T106, the printer 100 changes the WFD flag 138 in the memory 134 from "OFF" to "ON", and shifts from the device state to the G/O state.

In T108, the printer 100 shifts from a non-respondent state to a respondent state. The non-respondent state is a state in which the Wi-Fi I/F 116 does not send a DPP Authentication Response (hereinbelow simply termed "ARes") (see T210 of FIG. 4 to be described later) even when a DPP Authentication Request (hereinbelow simply termed "AReq") is received from the terminal 10 (see T220 to be described later). The respondent state is a state in which the Wi-Fi I/F 116 sends the ARes to the terminal 10 in response to receiving the AReq from the terminal 10. That is, the printer 100 shifts to a state of being able to execute the Auth (see T25 of FIG. 2) by shifting from the non-respondent state to the respondent state. Specifically, in this embodiment, the non-respondent state is a state in which even when the Wi-Fi I/F 116 receives a signal from outside, the Wi-Fi I/F 116 does not supply the signal to the CPU 132. Further, the respondent state is a state in which in response to receiving a signal from outside, the Wi-Fi I/F 116 supplies the signal to the CPU 132 and sends a response to this signal. Since the respondent state is a state in which the CPU 132 processes the signal received from outside, processing load in that state is higher than that in the non-respondent state. In a variant, the non-respondent state may be a state in which electricity is not supplied to the Wi-Fi I/F 116, and the respondent state may be a state in which electricity is supplied to the Wi-Fi I/F 116. Further, in another variant, the non-respondent state may be a state in which even when the Wi-Fi I/F 116 receives the AReq from outside, the Wi-Fi I/F 116 does not supply a notification that the AReq has been received to the CPU 132, and the respondent state may be a state in which in response to receiving the AReq from outside, the Wi-Fi I/F 116 supplies the notification that the AReq has been received to the CPU 132.

In T110, the NFC I/F 118 of the printer 100 sends the WFD information and the BS information to the terminal 10 by using the established NFC connection.

When the app 38 is activated in T103, the terminal 10 executes following processes in accordance with the app 38. In a case where the terminal 10 receives the WFD information and the BS information from the printer 100 via the NFC I/F 18 in T110, the terminal 10 causes the display unit 14 to display a selection screen in T112. The selection screen includes an "AP" button indicating that a process for establishing a DPP connection between the printer 100 and the AP 6 is to be executed, and a "terminal" button indicating that a process for establishing a WFD connection between the terminal 10 and the printer 100 is to be executed. That is, in other words, the selection screen is a screen for causing the user to select one connection scheme from among the DPP scheme and the WFD scheme.

In T120, the terminal 10 accepts from the user an operation for selecting the "AP" button in the selection screen. When the process of T120 is completed, the process of FIG. 3 is terminated.

Figure 4:
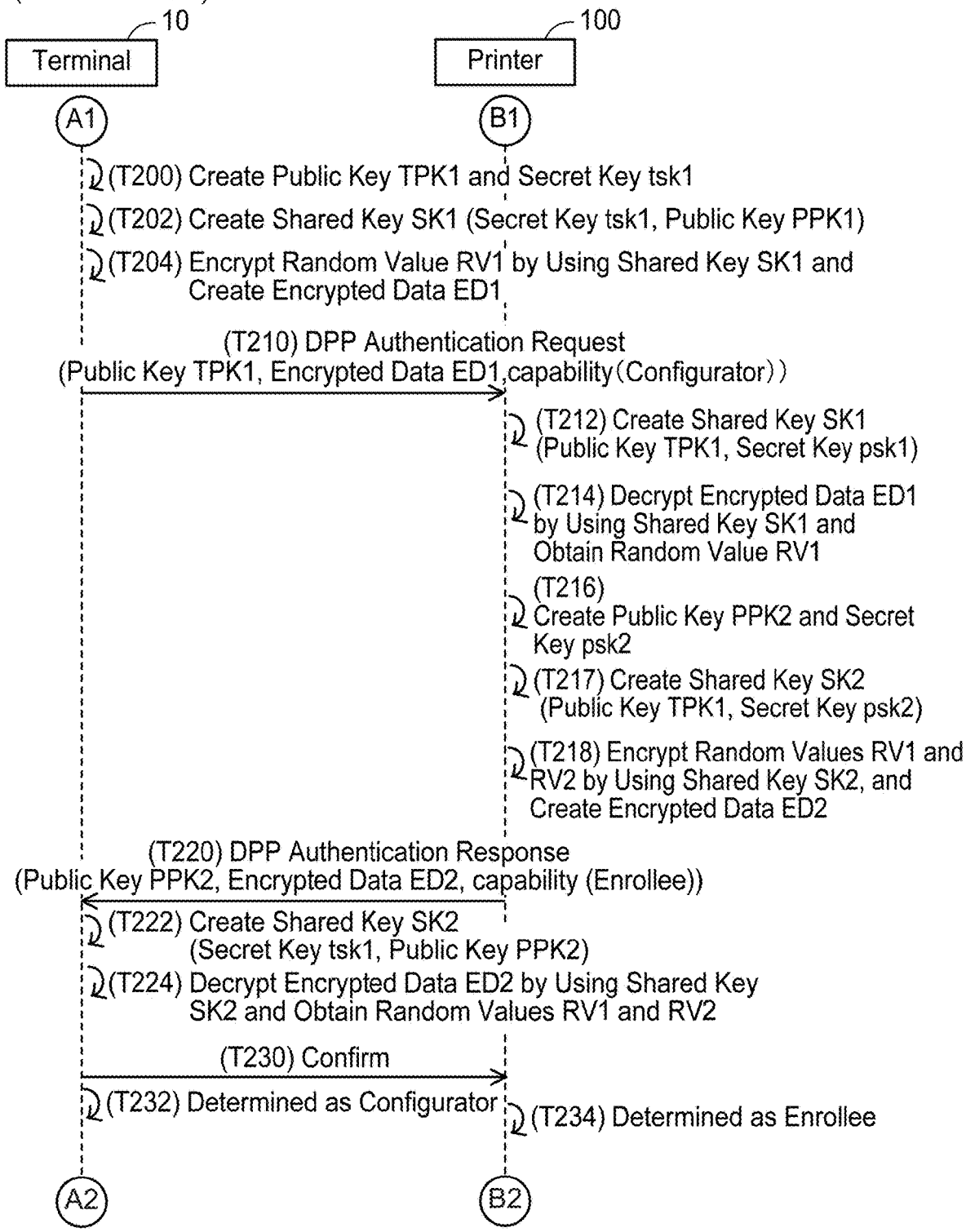
FIG. 4 shows a sequence view of a process of Authentication.

(Authentication (Auth); FIG. 4)

Next, the process of the Auth in T25 of FIG. 2 will be described with reference to FIG. 4. In response to the "AP" button in the selection screen being selected by the user in T120 of FIG. 3, the terminal 10 creates a public key TPK1 and a secret key tsk1 of the terminal 10 in T200. Next, in T202, the terminal 10 creates a shared key SK1 according to Elliptic curve Diffie-Hellman key exchange (ECDH) by using the created secret key tsk1 and the public key PPK1 of the printer 100 received in T110 of FIG. 3. Then, in T204, the terminal 10 creates encrypted data ED1 by using the created shared key SK1 to encrypt a random value RV1.

In T210, the terminal 10 sends an AReq via the Wi-Fi I/F 16 to the printer 100 by setting the MAC address of the printer 100 received in T110 of FIG. 3 as its destination. The AReq is a signal for requesting the printer 100 to execute authentication. Here, the terminal 10 repeats sending the AReq to the printer 100 by sequentially using the plurality of communication channels in the channel list received in T110. The AReq includes the public key TPK1 of the terminal 10 created in T200, the encrypted data ED1 created in T204, and a capability of the terminal 10.

The capability is information that is pre-designated in a device supporting the DPP scheme, and includes any one of following values: a value indicating that this device is capable of operating only as a Configurator according to the DPP scheme, a value indicating that this device is capable of operating only as an Enrollee according to the DPP scheme, and a value indicating that this device is capable of operating as whichever one of the Configurator and the Enrollee. The Configurator refers to a device configured to send a CO used in the NA (T35 of FIG. 2) to an Enrollee in the Config (T30 of FIG. 2). On the other hand, the Enrollee refers to a device that receives the CO used in the NA from the Configurator in the Config. As above, in this embodiment, the terminal 10 creates the COs for AP and for printer and sends them respectively to the AP 6 and the printer 100. As such, the capability of the terminal 10 includes the value indicating that it is capable of operating only as the Configurator.

The printer 100 receives the AReq from the terminal 10 via the Wi-Fi I/F 116 in T210. As above, this AReq is sent with the MAC address of the printer 100 as the destination. As such, the printer 100 can suitably receive this AReq from the terminal 10.

Further, when the printer 100 shifts to the respondent state in T108 of FIG. 3, it monitors receipt of the AReq using one communication channel among the plurality of communication channels in the channel list. As above, the AReq in T210 is sent by sequentially using the plurality of communication channels in the channel list. As such, the printer 100 can suitably receive this AReq from the terminal 10.

Next, the printer 100 executes following processes for authenticating the sender of the AReq (that is, the terminal 10). Specifically, firstly, in T212, the printer 100 creates a shared key SK1 according to the ECDH by using the public key TPK1 of the terminal 10 in the AReq and the secret key psk1 of the printer 100 stored in advance in the memory 134. Here, the shared key SK1 created by the terminal 10 in T202 and the shared key SK1 created by the printer 100 in T212 are identical to each other. Thus, the printer 100 can suitably decrypt the encrypted data ED1 in the AReq by using the created shared key SK1 in T214, as a result of which it can obtain the random value RV1. In a case where the decryption of the encrypted data ED1 succeeds, the printer 100 determines that the sender of the AReq is the device with which the NFC connection has been established in T104 of FIG. 3, that is, determines that the authentication succeeded, and executes subsequent processes from T216. On the other hand, in a case where the decryption of the encrypted data ED1 does not succeed, the printer 100 determines that the sender of the AReq is not the device with which the NFC connection has been established in T104, that is, determines that the authentication failed, and does not execute the subsequent processes from T216.

In T216, the printer 100 creates a new public key PPK2 and a new secret key psk2 of the printer 100. In a variant, the public key PPK2 and the secret key psk2 may be stored in advance in the memory 134. Next, in T217, the printer 100 creates a shared key SK2 according to the ECDH by using the public key TPK1 of the terminal 10 in the AReq of T210 and the created secret key psk2 of the printer 100. Then, in T218, the printer 100 creates encrypted data ED2 by using the created shared key SK2 to encrypt the obtained random value RV1 and a new random value RV2.

In T220, the printer 100 sends an ARes to the terminal 10 via the Wi-Fi I/F 116. This ARes includes the public key PPK2 of the printer 100 created in T216, the encrypted data ED2 created in T218, and a capability of the printer 100. This capability includes the value indicating that the printer 100 is capable of operating only as the Enrollee.

In response to receiving the ARes from the printer 100 via the Wi-Fi I/F 16 in T220, the terminal 10 executes following processes for authenticating the sender of the ARes (that is, the printer 100). Specifically, firstly in T222, the terminal 10 creates a shared key SK2 according to the ECDH by using the secret key tsk1 of the terminal 10 created in T200 and the public key PPK2 of the printer 100 in the ARes. Here, the shared key SK2 created by the printer 100 in T217 and the shared key SK2 created by the terminal 10 in T222 are identical to each other. Thus, the terminal 10 can suitably decrypt the encrypted data ED2 in the ARes by using the created shared key SK2 in T224, as a result of which it can obtain the random values RV1 and RV2. In a case where the decryption of the encrypted data ED2 succeeds, the terminal 10 determines that the sender of the ARes is the device with which the NFC connection has been established in T104 of FIG. 3, that is, determines that the authentication succeeded, and executes subsequent processes from T230. On the other hand, in a case where the decryption of the encrypted data ED2 does not succeed, the terminal 10 determines that the sender of the ARes is not the device with which the NFC connection has been established in T104, that is, determines that the authentication failed, and does not execute the subsequent processes from T230.

In T230, the terminal 10 sends a Confirm to the printer 100 via the Wi-Fi I/F 16. The Confirm includes information indicating that the terminal 10 operates as the Configurator and the printer 100 operates as the Enrollee. As a result, the terminal 10 determines to operate as the Configurator in T232, and the printer 100 determines to operate as the Enrollee in T234. When the process of T234 is completed, the process of FIG. 4 is terminated.

Figure 5:
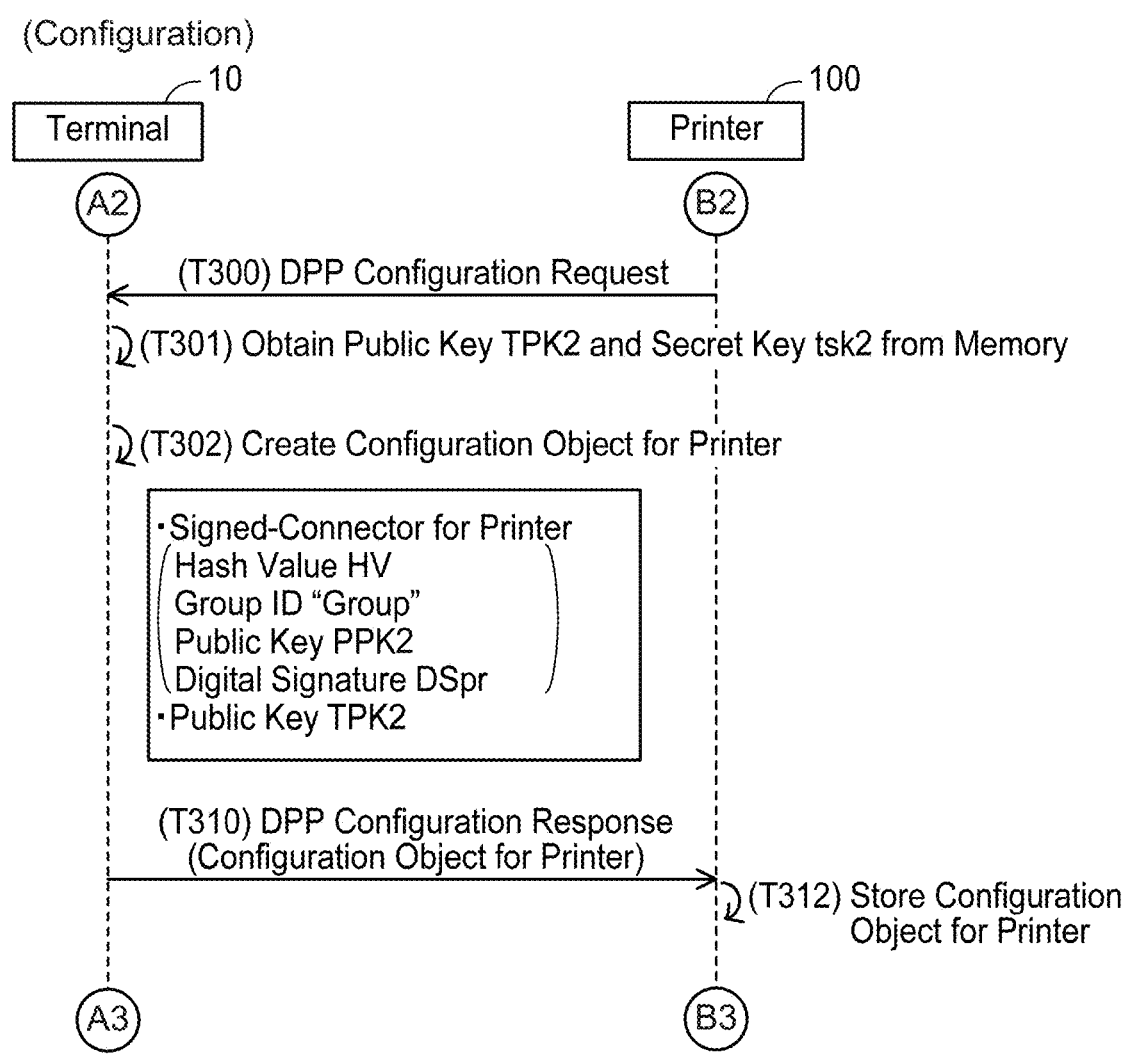
FIG. 5 shows a sequence view of a process of Configuration.

(Configuration (Config); FIG. 5)

Next, the process of Config in T30 of FIG. 2 will be described with reference to FIG. 5. In T300, the printer 100 sends a DPP Configuration Request (hereinbelow termed simply as "CReq") to the terminal 10 via the Wi-Fi I/F 116. This CReq is a signal requesting the CO (that is, the information for establishing the DPP connection between the printer 100 and the AP 6) to be sent.

The terminal 10 receives the CReq from the printer 100 in T300 via the Wi-Fi I/F 16. In this case, the terminal 10 obtains a group ID "Group", a public key TPK2, and a secret key tsk2 from a memory 34 of the terminal 10 in T301. As aforementioned, the terminal 10 have already executed the Config in T15 of FIG. 2 with the AP 6, and at that occasion the terminal 10 creates the group ID "Group", the public key TPK2, and the secret key tsk2 and stored the same in the memory. The group ID "Group" is information for identifying a wireless network formed by the DPP connection being established between the printer 100 and the AP 6. In a variant, a character string designated by the user may be used as the group ID. That is, in T301, the terminal 10 obtains the respective information that were stored in T15 of FIG. 2. Next, in T302, the terminal 10 creates the CO for printer (see T30 of FIG. 2). Specifically, the terminal 10 executes following processes.

The terminal 10 creates a hash value HV by hashing the public key TPK2 of the terminal 10. Further, the terminal 10 creates a specific value by hashing a combination of the hash value HV, the group ID "Group", and the public key PPK2 of the printer 100 in the ARes in T220 of FIG. 4. Then, the terminal 10 creates a digital signature DSpr by using the secret key tsk2 of the terminal 10 to encrypt the created specific value in accordance with an Elliptic Curve Digital Signature Algorithm (ECDSA). As a result, the terminal 10 can create a Signed-Connector for printer (hereinbelow, the Signed-Connector is termed simply as "SCont") including the hash value HV, the group ID "Group", the public key PPK2 of the printer 100, and the digital signature DSpr. Further, the terminal 10 creates the CO for printer including the SCont for printer and the public key TPK2 of the terminal 10.

In T310, the terminal 10 sends a DPP Configuration Response (hereinbelow termed simply as "CRes") including the CO for printer to the printer 100 via the Wi-Fi I/F 16.

The printer 100 receives the CRes from the terminal 10 in T310 via the Wi-Fi I/F 116. In this case, the printer 100 stores the CO for printer in the CRes in the memory 134 in T312. When the process of T312 is completed, the process of FIG. 5 is terminated.

Figure 6:
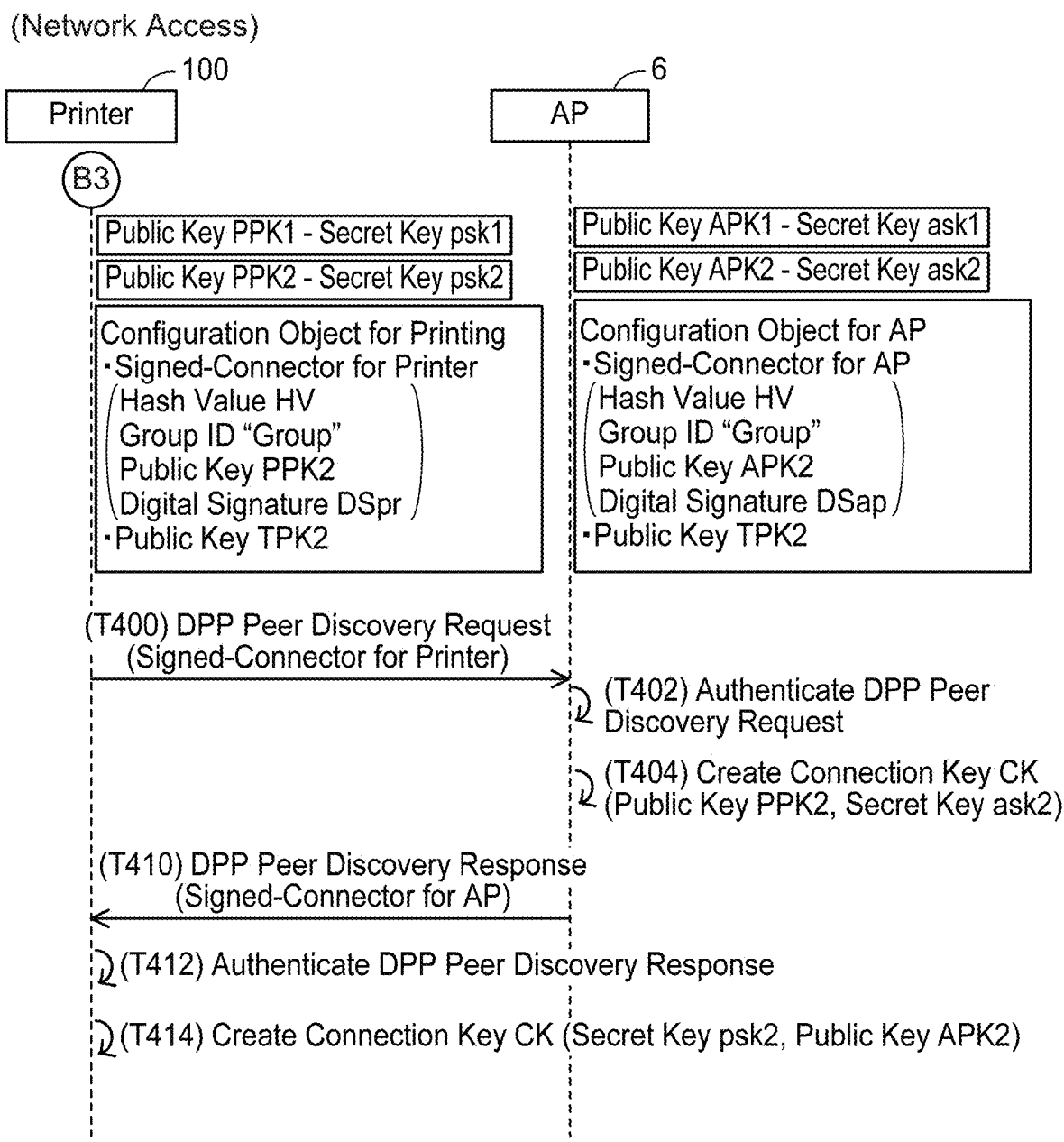
FIG. 6 shows a sequence view of a process of Network Access.

(Network Access (NA); FIG. 6)

Next, the process of the NA in T35 of FIG. 2 executed between the printer 100 and the AP 6 will be described with reference to FIG. 6. As aforementioned, the processes of T5 to T15 of FIG. 2 have already been executed between the terminal 10 and the AP 6, similarly to T20 to T30 of FIG. 2. However, the AP 6 does not execute the processes of T102 to T110 of FIG. 3. The AP 6 stores in advance a public key APK1 and a secret key ask1 of the AP 6. Further, a QR code, which is obtained by coding the public key APK1 of the AP 6, a channel list of the AP 6, and a MAC address of the AP 6, is adhered to a housing of the AP 6. Processes similar to the processes from T200 of FIG. 4 onward are executed between the terminal 10 and the AP 6 when the terminal 10 captures this QR code. As a result, the AP 6 stores a public key APK2 and a secret key ask2 of the AP 6 (see T216 of FIG. 4), and further stores the CO for AP received from the terminal 10 (see T312 of FIG. 5). The CO for AP includes a SCont for AP and a public key TPK2 of the terminal 10. This public key TPK2 is identical to the public key TPK2 included in the CO for printer. Further, the SCont for AP includes a hash value HV, a group ID "Group", the public key APK2 of the AP 6, and a digital signature DSap. This hash value HV and this group ID "Group" are respectively identical to the hash value HV and the group ID "Group1" included in the CO for printer. The digital signature DSap is information in which a specific value, which is obtained by hashing a combination of the hash value HV, the group ID "Group", and the public key APK2, is encrypted by the secret key tsk2 of the terminal 10, and is a value different from the digital signature DSpr included in the CO for printer.

In T400, the printer 100 sends a DPP Peer Discovery Request (hereinbelow termed simply as "DReq") including the SCont for printer to the AP 6 via the Wi-Fi I/F 116. This DReq is a signal requesting the AP 6 to execute authentication and send the SCont for AP.

In response to receiving the DReq from the printer 100 in T400, the AP 6 executes a process for authenticating the sender of the DReq (that is, the printer 100) and the respective information in the DReq (that is, the hash value HV, the "Group", and the public key PPK2). Specifically, in T402, the AP 6 firstly executes a first AP determination process that is regarding whether or not the hash value HV and the group ID "Group" in the received SCont for printer are respectively identical to the hash value HV and the group ID "Group" in the SCont for AP included in the stored CO for AP. In the case of FIG. 6, the AP 6 determines "identical" in the first AP determination process, thus it determines that the authentication of the sender of the DReq (that is, the printer 100) succeeds. Here, the fact that the hash value HV in the received SCont for printer is identical to the hash value HV in the SCont for AP included in the stored CO for AP means that the SCont for printer and the SCont for AP were created by the same device (that is, the terminal 10). As such, the AP 6 also determines that authentication of the creator of the received SCont for printer (that is, the terminal 10) succeeds. Further, the AP 6 decrypts the digital signature DSpr in the received SCont for printer by using the public key TPK2 of the terminal 10 included in the stored CO for AP. Since the decryption of the digital signature DSpr succeeds in the case of FIG. 6, the AP 6 executes a second AP determination process that is regarding whether or not a specific value obtained by decrypting the digital signature DSpr is identical to a value obtained by hashing the respective information in the received SCont for printer (that is, the hash value HV, the "Group", and the public key PPK2). In the case of FIG. 6, the AP 6 determines "identical" in the second AP determination process, thus it determines that the authentication of the respective information in the DReq succeeds, and executes processes from T404 onward. The fact that the AP 6 determines "identical" in the second AP determination process means that the respective information in the received SCont for printer (that is, the hash value HV, the "Group", and the public key PPK2) has not been tampered by a third party since the CO for printer was stored in the printer 100. On the other hand, in a case where the AP 6 determines "not identical" in the first AP determination process, in a case where the decryption of the digital signature DSpr fails, or in a case where the AP 6 determines "not identical" in the second AP determination process, the AP 6 determines that the authentication fails and does not execute the processes from T404.

Next, in T404, the AP 6 creates a connection key CK (that is, a shared key) by using the obtained public key PPK2 of the printer 100 and the stored secret key ask2 of the AP 6 in accordance with the ECDH.

In T410, the AP 6 sends a DPP Peer Discovery Response (hereinbelow termed simply as "DRes") including the SCont for AP to the printer 100.

In response to receiving the DRes from the AP 6 in T410 via the Wi-Fi I/F 116, the printer 100 executes a process for authenticating the sender of the DRes (that is, the AP 6) and the respective information in the DRes (that is, the hash value HV, the "Group1", and the public key APK2). Specifically, in T412, the printer 100 firstly executes a first PR determination process that is regarding whether or not the hash value HV and the group ID "Group" in the received SCont for AP are respectively identical to the hash value HV and the group ID "Group" in the SCont for printer included in the stored CO for printer. In the case of FIG. 6, the printer 100 determines "identical" in the first PR determination process, thus it determines that the authentication of the sender of the DRes (that is, the AP 6) succeeds. The fact that the hash value HV in the received SCont for AP is identical to the hash value HV in the SCont for printer included in the stored CO for printer means that the SCont for printer and the SCont for AP were created by the same device (that is, the terminal 10). As such, the printer 100 also determines that authentication of the creator of the received SCont for AP (that is, the terminal 10) succeeds. Further, the printer 100 decrypts the digital signature DSap in the received SCont for AP by using the public key TPK2 of the terminal 10 included in the stored CO for printer. Since the decryption of the digital signature DSap succeeds in the case of FIG. 6, the printer 100 executes a second PR determination process that is regarding whether or not a specific value obtained by decrypting the digital signature DSap is identical to a value obtained by hashing the respective information in the received SCont for AP (that is, the hash value HV, the "Group", and the public key APK2). In the case of FIG. 6, the printer 100 determines "identical" in the second PR determination process, thus it determines that the authentication of the respective information in the DRes succeeds, and executes processes from T414 onward. The fact that the printer 100 determines "identical" in the second PR determination process means that the respective information in the SCont for AP (that is, the hash value HV, the "Group", and the public key APK2) has not been tampered by a third party since the CO for AP was stored in the AP 6. On the other hand, in a case where the printer 100 determines "not identical" in the first PR determination process, in a case where the decryption of the digital signature DSap fails, or in a case where the printer 100 determines "not identical" in the second PR determination process, the printer 100 determines that the authentication fails and does not execute the processes from T414.

In T414, the printer 100 creates a connection key CK by using the stored secret key psk2 of the printer 100 and the public key APK2 of the AP 6 in the received SCont for AP in accordance with the ECDH. Here, the connection key CK created by the AP 6 in T404 and the connection key CK created by the printer 100 in T414 are identical to each other. Due to this, the connection key CK for establishing the DPP connection is shared between the printer 100 and the AP 6. When T414 is completed, the process of FIG. 6 is terminated.

As above, after the connection key CK has been shared between the printer 100 and the AP 6, in T40 of FIG. 2 the printer 100 and the AP 6 use the connection key CK to execute communication of a 4 way-handshake. As a result, a DPP connection is established between the printer 100 and the AP 6. The printer 100 changes the WFD flag 138 from "ON" to "OFF" in a case of establishing the DPP connection with the AP 6.

Figure 7:
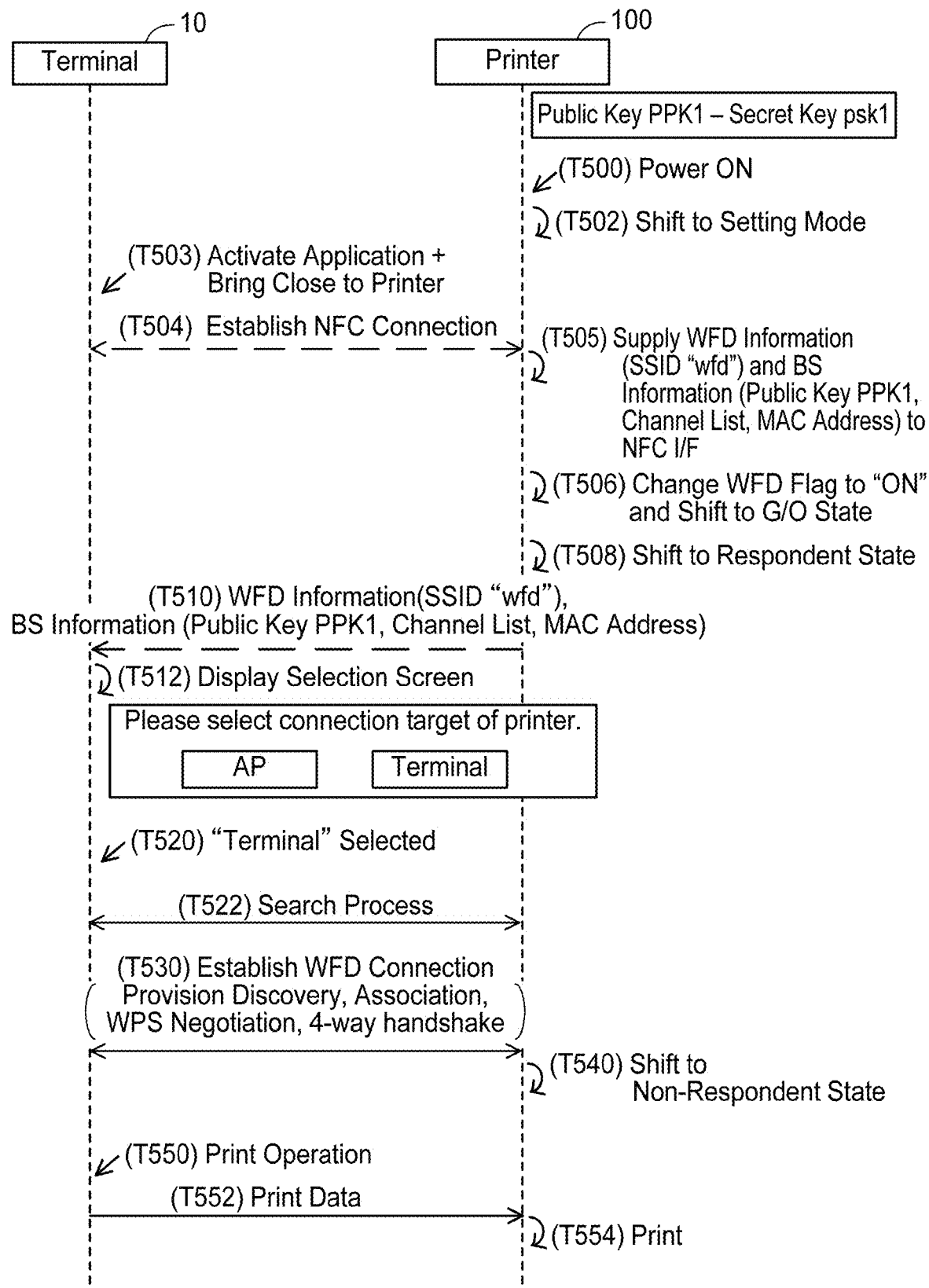
FIG. 7 shows a sequence view of a process of Case B in which a WFD connection is established between a terminal and the printer.

(Case B; FIG. 7)

Next, the process of Case B in which a WFD connection is established between the terminal 10 and the printer 100 will be described with reference to FIG. 7. T500 to T512 are similar to T100 to T112 of FIG. 3. In response to the "terminal" button being selected by the user in the selection screen in T520, the terminal 10 executes a search process for searching for a device that is a connection target of the terminal 10 (that is, the printer 100) in T522. Specifically, the following processes are executed.

Firstly, the terminal 10 sends a Probe Request (hereinbelow termed simply as "PReq") by broadcast via the Wi-Fi I/F 16. When the terminal 10 sends the PReq by broadcast, the terminal 10 receives a respective Probe Response (hereinbelow termed simply as "PRes") from one or more devices including the printer 100. In this case, the terminal 10 specifies the printer 100 that is the connection target by specifying a PRes including the SSID "wfd" received in T510 from among the one or more PRes. Then, the terminal 10 sends a PReq including the SSID "wfd" of the specified printer 100 to the printer 100 via the Wi-Fi I/F 16 (that is, sends by unicast).

In response to receiving the PReq including the SSID "wfd" from the terminal 10, the printer 100 sends a PRes to the terminal 10 via the Wi-Fi I/F 116.

In T530, the terminal 10 executes various communications with the printer 100 (Provision Discovery, Association, WPS Negotiation, 4 way-handshake). In the WPS Negotiation, the terminal 10 receives wireless setting information including the SSID "wfd" and password being stored in the memory 134 from the printer 100. Then, the terminal 10 executes the 4 way-handshake communication with the printer 100 by using the SSID "wfd" and the password to establish a WFD connection with the printer 100.

In a case where a WFD connection with the terminal 10 is established in T530, the printer 100 shifts from the respondent state to the non-respondent state in T540. In a situation where a WFD connection is established between the terminal 10 and the printer 100, a possibility is low that communication according to the DPP scheme is executed between the terminal 10 and the printer 100. In such a situation, since the printer 100 shifts from the respondent state to the non-respondent state, it is possible to suppress maintenance of the respondent state which has a higher processing load than the non-respondent state.

In response to accepting a print operation at T550 from the user for causing the printer 100 to execute printing, in T552 the terminal 10 sends print data to the printer 100 via the Wi-Fi I/F 16 by using the established WFD connection.

In a case of receiving the print data from the terminal 10 via the Wi-Fi I/F 116 in T552, the printer 100 causes the print executing unit 120 to execute printing according to the print data in T554. When the process of T554 is completed, the process of FIG. 7 is terminated.

Figure 8:
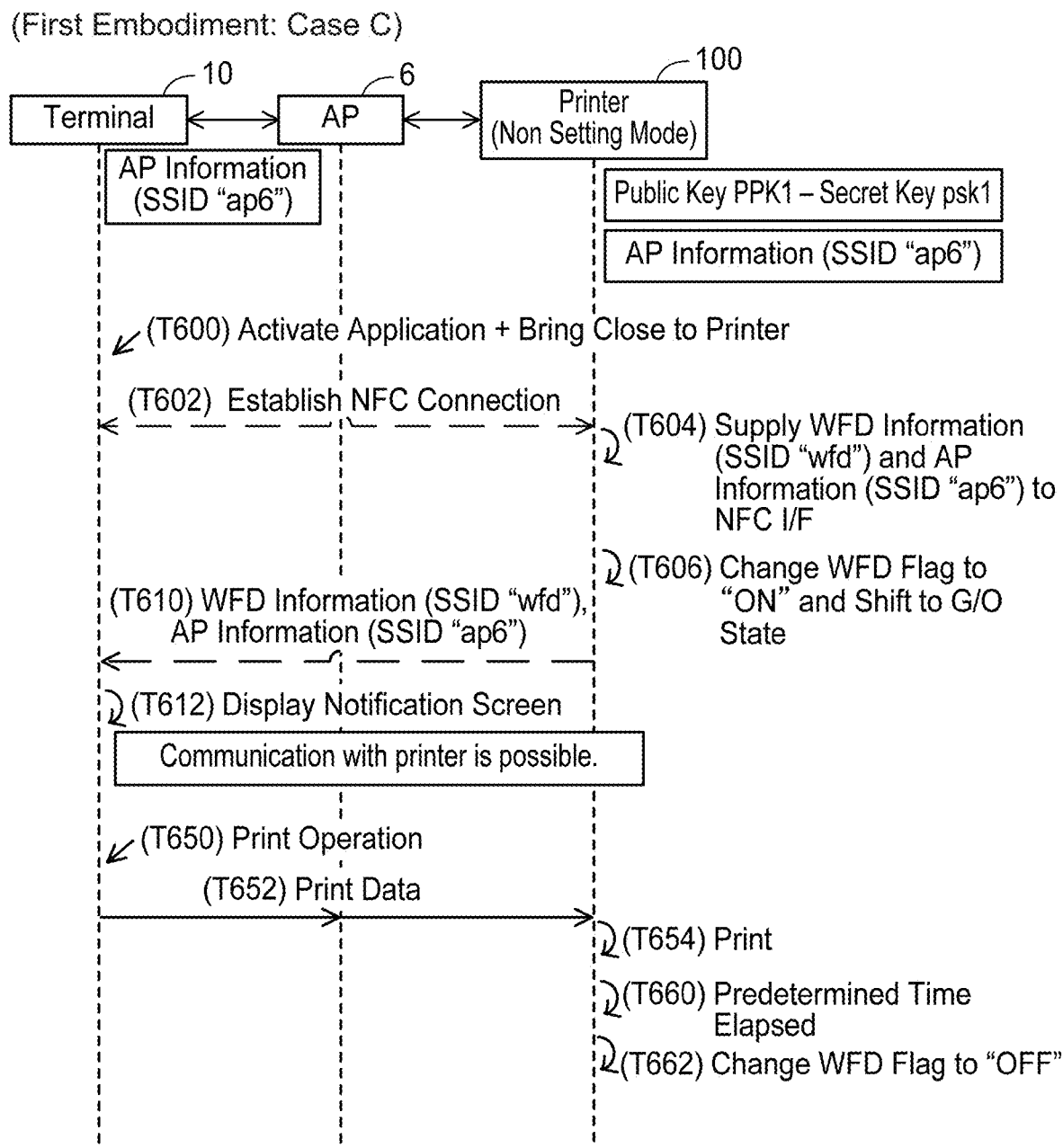
FIG. 8 shows a sequence view of a process of Case C in which the terminal and the printer have established a Wi-Fi connection with an access point.

(Case C; FIG. 8)

Next, a process of Case C will be described with reference to FIG. 8. In Case C, the terminal 10 and the printer 100 has established a normal Wi-Fi connection with the AP 6. For this reason, the memory 34 of the terminal 10 and the memory 134 of the printer 100 are storing AP information for establishing the normal Wi-Fi connection with the AP 6. The AP information includes an SSID "ap6" for identifying the wireless network formed by the AP 6. In an initial state of FIG. 8, since the AP information is being stored in the memory 134, the printer 100 is operating in the non-setting mode.

T600 and T602 are similar to T100 and T102 of FIG. 3. In T604, the printer 100 acquires a signal indicating that the NFC connection is established from the NFC I/F 118, determines that the operation mode of the printer 100 is the non-setting mode, and supplies the WFD information including the SSID "wfd" and the AP information including the SSID "ap6" to the NFC I/F 118. T606 is similar to T106 of FIG. 3. In T610, the NFC I/F 118 of the printer 100 sends the WFD information and the AP information to the terminal 10 by using the established NFC connection.

In T610, in a case of receiving the WFD information and the AP information from the printer 100 via the NFC I/F 18, the terminal 10 determines that the SSID "ap6" included in the received AP information is identical to the SSID "ap6" in the AP information stored in the memory 34. In this case, the terminal 10 determines that communication with the printer 100 is currently possible and, in T612, displays a notification screen indicating that communication with the printer 100 is currently possible.

T650 to T654 are similar to T550 to T554 of FIG. 7. In T660, the printer 100 determines that a predetermined time has elapsed since the WFD 138 was changed to "ON" in T606 and, in T662, changes the WFD 138 from "ON" to "OFF". When the process of T662 is completed, the process of FIG. 8 is terminated.

As above, in a case where an NFC connection is established with the terminal 10 (T602) in a situation of a normal Wi-Fi connection with the AP 6 being established, the printer 100 supplies the AP information to the NFC I/F 118 (T604). Due to this, the AP information is sent from the NFC I/F 118 to the terminal 10, so that the terminal 10 can use the received AP information to determine whether communication with the printer 100 is currently possible. Then, in a case of determining that communication with the printer 100 is currently possible, the terminal 10 displays the notification screen. That is, in a situation where the terminal 10 and the printer 100 are currently capable of communicating with each other, the printer 100 does not execute the process for establishing a DPP connection between the printer 100 and the AP 6, or the process for establishing a WFD connection between the terminal 10 and the printer 100. As such, the processing load of the terminal 10 and the printer 100 can be reduced.

Figure 9:
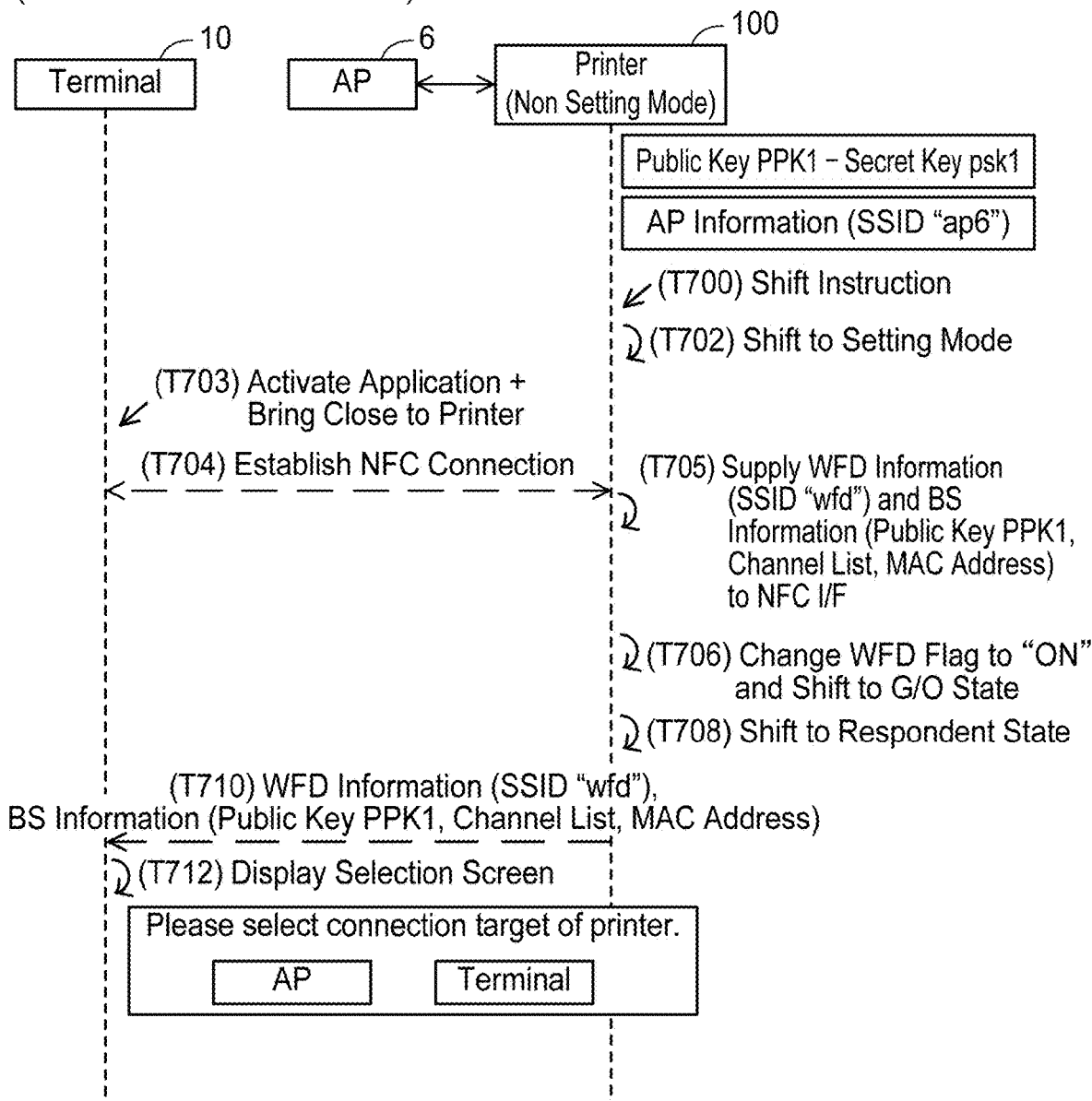
FIG. 9 shows a sequence view of a process of Case D in which a mode shifting operation is executed in the printer.

(Case D; FIG. 9)

Next, the process of Case D, in which a mode shifting operation is executed in the printer 100, will be described with reference to FIG. 9. In Case D, the printer 100 has established a normal Wi-Fi connection with the AP 6. As such, the printer 100 is storing the AP information including the SSID "ap6" in the memory 134. Further, in an initial state of FIG. 9, the printer 100 is operating in the non-setting mode.

In a case where a shift instruction for shifting the operation mode of the printer 100 is accepted from the user in T700, the printer 100 shifts from the non-setting mode to the setting mode in T702. T703 and T704 are similar to T103 and T104 of FIG. 3.

In T705, the printer 100 acquires a signal from the NFC I/F 118 indicating that the NFC connection has been established, determines that the operation mode of the printer 100 is the setting mode, and supplies the WFD information and the BS information to the NFC I/F 118. T706 to T712 are similar to T106 to T112 of FIG. 3. That is, the WFD information and the BS information are sent from the NFC I/F 118 of the printer 100 to the terminal 10, and a selection screen is displayed on the terminal 10. When the process of T712 is completed, the process of FIG. 9 is terminated.

As above, in a situation where a normal Wi-Fi connection is established between the printer 100 and the AP 6, that is, in a situation where the printer 100 is operating in the non-setting mode, the printer 100 shifts to the setting mode in a case where the shift instruction is accepted from the user (T702). Then, the printer 100 supplies the WFD information and the BS information to the NFC I/F 118 in response to the establishment of the NFC connection with the terminal 10 (T705). As a result, the WFD information and the BS information are sent from the NFC I/F 118 to the terminal 10 (T710). Due to this, in a situation where the user desires to execute communication according to the DPP scheme between the terminal 10 and the printer 100, for example, in a situation where the user desires to establish a DPP connection between the printer 100 and an AP different from the AP 6, the user can cause communication according to the DPP scheme to be executed between the terminal 10 and the printer 100 by executing the shift instruction in the printer 100 that is operating in the non-setting mode.

Figure 10:
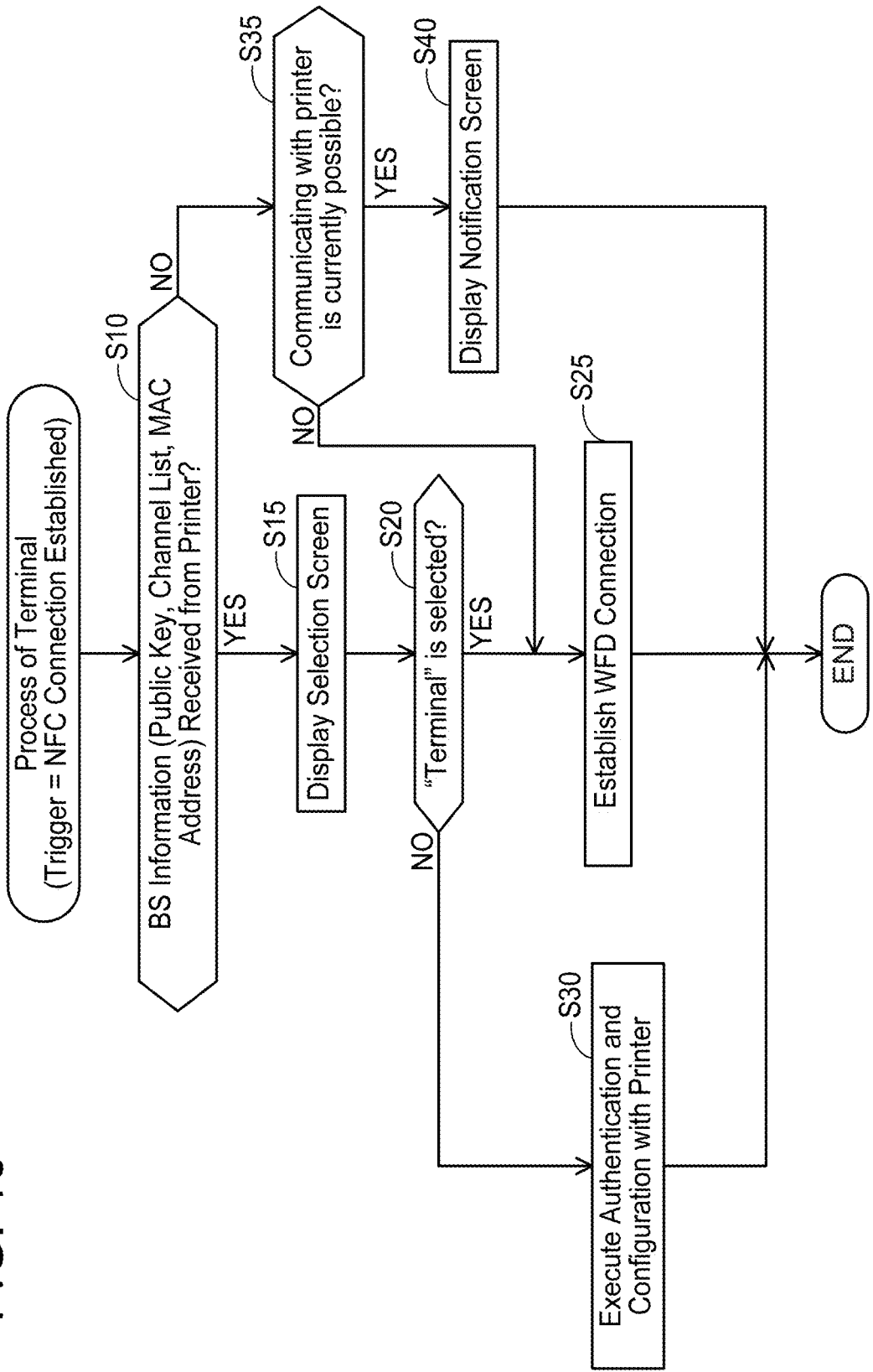
FIG. 10 shows a flowchart of a process executed by the terminal.

(Process of Terminal 10; FIG. 10)

Next, a process executed by the CPU 32 of the terminal 10 in order to realize the processes of FIGS. 2 to 9 will be described with reference to FIG. 10. A process of FIG. 10 is executed in a case where an NFC connection is established between the NFC I/F 18 of the terminal 10 and the NFC I/F 118 of the printer 100.

In S10, the terminal 10 determines whether the BS information has been received from the printer 100 via the NFC I/F 18 by using the established NFC connection. In a case where the WFD information and the BS information are received from the printer 100 (for example, T110 of FIG. 3), the terminal 10 determines YES in S10, and proceeds to S15. On the other hand, in a case where the WFD information and the AP information are received from the printer 100 (for example, T610 of FIG. 8), the terminal 10 determines NO in S10, and proceeds to S35.

In S15, the terminal 10 displays the selection screen on the display unit 14 (for example, T112 of FIG. 3).

In S20, the terminal 10 determines whether the "terminal" button in the selection screen has been selected by the user. In a case where the "terminal" button in the selection screen has been selected by the user (for example, T520 of FIG. 7), the terminal 10 determines YES in S20, and proceeds to S25. On the other hand, in a case where the "AP" button in the selection screen has been selected (for example, T120 of FIG. 3), the terminal 10 determines NO in S20, and proceeds to S30.

In S25, the terminal 10 executes various communications with the printer 100 (Probe, Provision Discovery, Association, WPS Negotiation, 4 way-handshake) according to the WFD scheme via the Wi-Fi I/F 16, and establishes a WFD connection with the printer 100 (for example, T522 and T530 of FIG. 7). When the process of S25 is completed, the process of FIG. 10 is terminated.

In S30, the terminal 10 executes the Auth and the Config with the printer 100 via the Wi-Fi I/F 16 (FIG. 4 and FIG. 5). When the process of S30 is completed, the process of FIG. 10 is terminated.

In S35, the terminal 10 determines whether communication with the printer 100 is currently possible by using the received AP information. In a case of determining that communication with the printer 100 is currently possible, the terminal 10 determines YES in S35 and, in S40, causes the display unit 14 to display a notification screen (for example, T612 of FIG. 8). On the other hand, in a case of determining that communication with the printer 100 is not currently possible, the terminal 10 determines NO in S35 and, in S25, establishes a WFD connection with the printer 100 by using the received WFD information. When the process of S25 or S40 is completed, the process of FIG. 10 is terminated.

Figure 11:
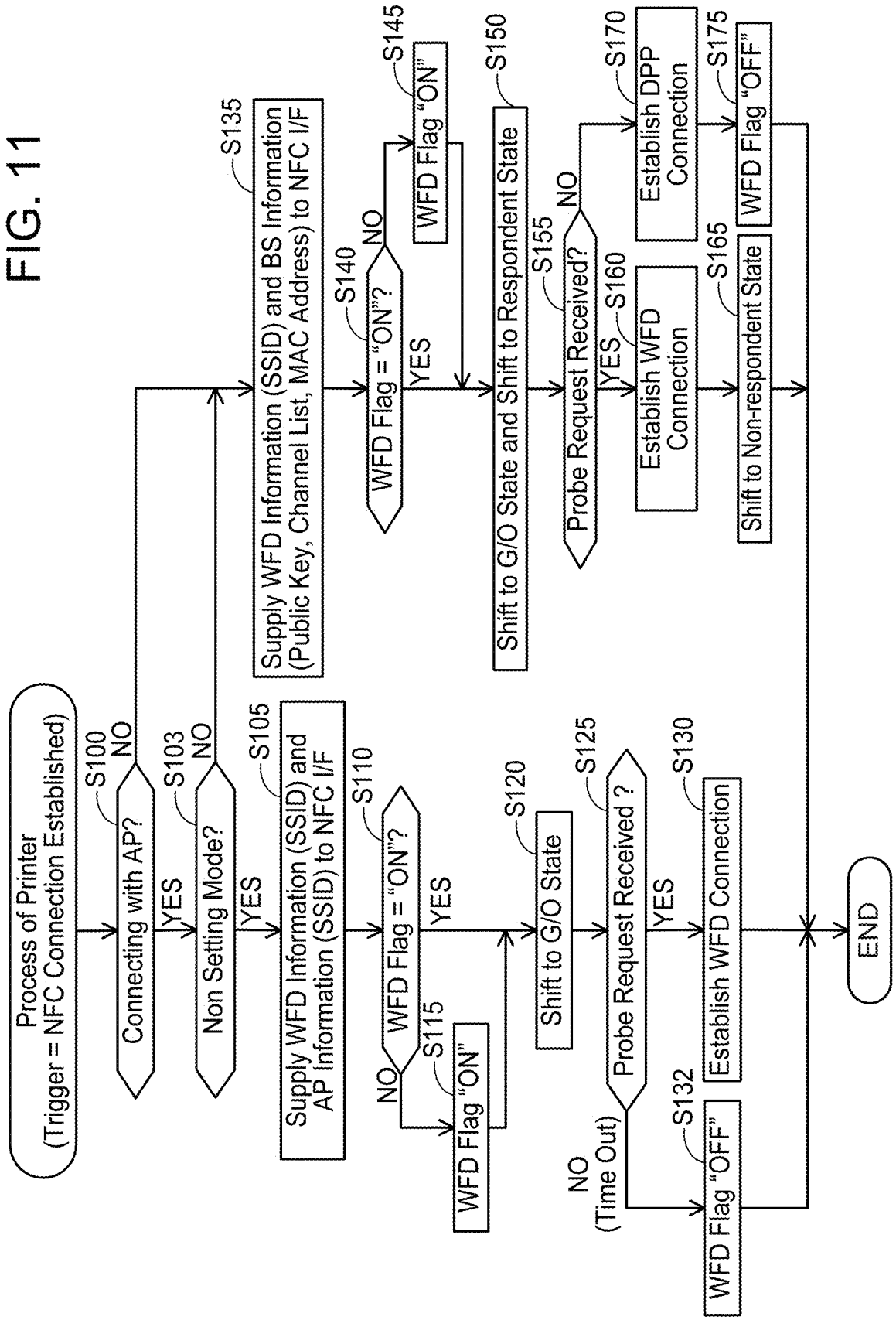
FIG. 11 shows a flowchart of a process executed by the printer.

(Process of Printer 100; FIG. 11)

Next, a process executed by the CPU 132 of the printer 100 in order to realize the processes of FIGS. 2 to 9 will be described with reference to FIG. 11. The process of FIG. 11 is executed in a case where an NFC connection is established between the NFC I/F 18 of the terminal 10 and the NFC I/F 118 of the printer 100.

In S100, the printer 100 determines whether a normal Wi-Fi connection with the AP 6 is being established. In a case where the AP information is being stored in the memory 134, the printer 100 determines YES in S100, and proceeds to S103. On the other hand, in a case where the AP information is not being stored in the memory 134, the printer 100 determines NO in S100, and proceeds to S135.

In S103, the printer 100 determines whether it is operating in the non-setting mode. In case of determining that the printer 100 is operating in the non-setting mode (YES in S103), the printer 100 proceeds to S105. On the other hand, in case of determining that the printer 100 is operating in the setting mode (NO in S103), the printer 100 proceeds to S135.

In S105, the printer 100 supplies the WFD information and the AP information to the NFC I/F 118 (for example, T604 of FIG. 8). The WFD information includes an SSID for identifying the wireless network in which the printer 100 that is operating in the G/O state operates as a parent station. The AP information includes an SSID for identifying the wireless network in which the AP with which the printer 100 has established a normal Wi-Fi connection operates as a parent station.

In S110, the printer 100 determines whether the WFD flag 138 stored in the memory 134 indicates "ON". In a case where the WFD flag 138 indicates "ON", the printer 100 determines YES in S110, and proceeds to S120. On the other hand, in a case where the WFD flag 138 indicates "OFF", the printer 100 determines NO in S110, and proceeds to S115.

In S115, the printer 100 changes the WFD flag 138 stored in the memory 134 from "OFF" to "ON" (for example, T606 of FIG. 8). As a result, the printer 100 operates in the device state.

In S120, the printer 100 shifts from the device state to the G/O state (for example, T606 of FIG. 8).

In S125, the printer 100 monitors receipt of a PReq from the terminal 10 via the Wi-Fi I/F 116. In a case of receiving a PReq from the terminal 10, the printer 100 determines YES in S125, and proceeds to S130. On the other hand, in a case where a predetermined time elapses without receiving a PReq from the terminal 10 (for example, T660 of FIG. 8), the printer 100 determines NO in S125, and proceeds to S132.

In S130, the printer 100 executes various communications (Probe, Provision Discovery, Association, WPS Negotiation, 4 way-handshake) according to the WFD scheme with the terminal 10, and establishes a WFD connection with the terminal 10. When the process of S130 is completed, the process of FIG. 11 is terminated.

In S132, the printer 100 changes the WFD flag stored in the memory 134 from "ON" to "OFF" (for example, T662 of FIG. 8). When the process of S132 is completed, the process of FIG. 11 is terminated.

In S135, the printer 100 supplies the WFD information and the BS information to the NFC I/F 118 (for example, T105 of FIG. 3). The BS information includes the public key of the printer 100, the channel list, and the MAC address of the printer 100.

S140 and S145 are similar to S110 and S115. In S150, the printer 100 shifts from the device state to the G/O state, and shifts from the non-respondent state to the respondent state (for example, T106 and T108 of FIG. 3).

S155 is similar to S125. In case of receiving a PReq from the terminal 10 via the Wi-Fi I/F 116 (for example, T522 of FIG. 7), the printer 100 determines YES in S155, and proceeds to S160. On the other hand, in case of receiving an AReq from the terminal 10 via the Wi-Fi I/F 116 (for example, T210 of FIG. 4), the printer 100 determines NO in S155, and proceeds to S170.

S160 is similar to S130. In S165, the printer 100 shifts from the respondent state to the non-respondent state (for example, T540 of FIG. 7). When the process of S165 is completed, the process of FIG. 11 is terminated.

In S170, the printer 100 executes the Auth and the Config with the terminal 10 (for example, FIG. 4 and FIG. 5), and executes the NA and 4 way-handshake with the AP 6 (for example, FIG. 6, T40 of FIG. 2) to establish a DPP connection with the AP 6.

In S175, the printer 100 changes the WFD flag stored in the memory 134 from "ON" to "OFF". When the process of S175 is completed, the process of FIG. 11 is terminated.

Effect of the Present Embodiment

According to the present embodiment, the printer 100 supplies the BS information including the public key PPK1 of the printer 100, and the WFD information including the SSID "wfd" to the NFC I/F 118 (T105 of FIG. 3). As a result, in a case where an NFC connection with the printer 100 is established (T104 of FIG. 3), the terminal 10 receives the BS information and the WFD information from the printer 100 (T110), and displays the selection screen (T112). In a case where the "AP" button in the selection screen is selected by the user (T120), that is, in a case of determining that a DPP connection is to be established between the printer 100 and the AP 6, the terminal 10 sends an AReq to the printer 100 (T210 of FIG. 4). In a case of receiving the AReq from the terminal 10, the printer 100 sends an ARes to the terminal 10 (T220). In a case of receiving the ARes from the printer 100, the terminal 10 sends a CRes including the CO for printer to the printer 100 (T310 of FIG. 5). In a case of receiving the CRes from the terminal 10, the printer 100 establishes a DPP connection between the printer 100 and the AP 6 by using the CO for printer (T35 and T40 of FIG. 2). That is, the printer 100 can establish a Wi-Fi connection according to the DPP scheme (that is, a DPP connection) with the AP 6. On the other hand, in a case where the "terminal" button in the selection screen is selected by the user (T520 of FIG. 7), that is, in a case of determining that a WFD connection is to be established between the terminal 10 and the printer 100, the terminal 10 sends a PReq including the SSID "wfd" included in the WFD information to the printer 100 (T522). In a case of receiving the PReq from the terminal 10, the printer 100 establishes a WFD connection between the terminal 10 and the printer 100 (T530). That is, the printer 100 can establish a WFD connection according to the WFD scheme with the terminal 10. As such, in response to the establishment of an NFC connection between the printer 100 and the terminal 10, the printer 100 can establish a DPP connection or a WFD connection different from the NFC connection according to an appropriate connection scheme among plurality of connection schemes.

Correspondence Relationship

The printer 100, the terminal 10, the AP 6 are an example of "a communication device", "a first external device", "a second external device", respectively. The NFC I/F 18, the NFC I/F 118 are an example of "a first wireless interface" of the "first external device", "a first wireless interface" of the "communication device" respectively, and the Wi-Fi I/F 16 is an example of "a second wireless interface" and "a third wireless interface" of the "first external device". The Wi-Fi I/F 116 is an example of the "second wireless interface" and "third wireless interface" of the "communication device". The public key PPK1, the SSID "wfd" of the printer 100 are an example of "a first public key (or a public key)", "specific information", respectively. The NFC connection of T104 of FIG. 3, the DPP connection of T40 of FIG. 2, the WFD connection of T530 of FIG. 7 are an example of "a first wireless connection", "a second wireless connection", "a third wireless connection", respectively. The DPP scheme, the WFD scheme are an example of "first connection scheme", "second connection scheme", respectively. The AReq of T210, the ARes of T220, the CO for printer of FIG. 4 are an example of "a first authentication request (or an authentication request)", "a first authentication response (or an authentication response)", "first connection information (or connection information)", respectively. The PReq including the SSID "wfd" sent from the terminal 10 in the search process of T522 is an example of the "specific information".

The print data of T552 of FIG. 7 is an example of "object data". The non-setting mode, the setting mode are an example of "a first mode", "a second mode", respectively. The AP information of T610 of FIG. 8 is an example of "determination information". The case where NO is determined in S20 of FIG. 10 is an example of "a case where it is determined that the second wireless connection is to be established", and the case where YES is determined in S20 is an example of "a case where it is determined that the third wireless connection is to be established".

The process of T504 of FIG. 7, the process of S135 of FIG. 11, the process of T220 of FIG. 4, the process of T310 of FIG. 5, the process of T35 and T40 of FIG. 2, and the process of T530 of FIG. 7 are an example of processes executed by "establish a first wireless connection", "supply a first public key that is a public key of the communication device and specific information to the first wireless interface", "send a first authentication response that is a response to the first authentication request to the first external device via the second wireless interface", "receive first connection information from the first external device via the second wireless interface", "establish, according to a first connection scheme, the second wireless connection between the communication device and the second external device via the second wireless interface by using the first connection information", "establish, according to a second connection scheme different from the first connection scheme, the third wireless connection between the communication device and the first external device via the third wireless interface" of the "communication device", respectively.

The process of T504 of FIG. 7, the process of S10, the process of S20 of FIG. 10, the process of T210, the process of T220 of FIG. 4, the process of T310 of FIG. 5, the process of T522, the process of T530 of FIG. 7 are an example of processes executed by "establish a first wireless connection", "receive a public key of the communication device and specific information from the communication device by using the first wireless connection via the first wireless interface", "determine which of the second wireless connection and the third wireless connection is to be established", "send an authentication request in which the public key is used to the communication device via the second wireless interface", "receive an authentication response that is a response to the authentication request from the communication device via the second wireless interface", "send connection information to the communication device via the second wireless interface", "send a specific signal including the specific information to the communication device via the third wireless interface", "establish, according to a second connection scheme different from the first connection scheme, the third wireless connection via the third wireless interface between the communication device and the first external device" of the "first external device", respectively.

Figure 12:
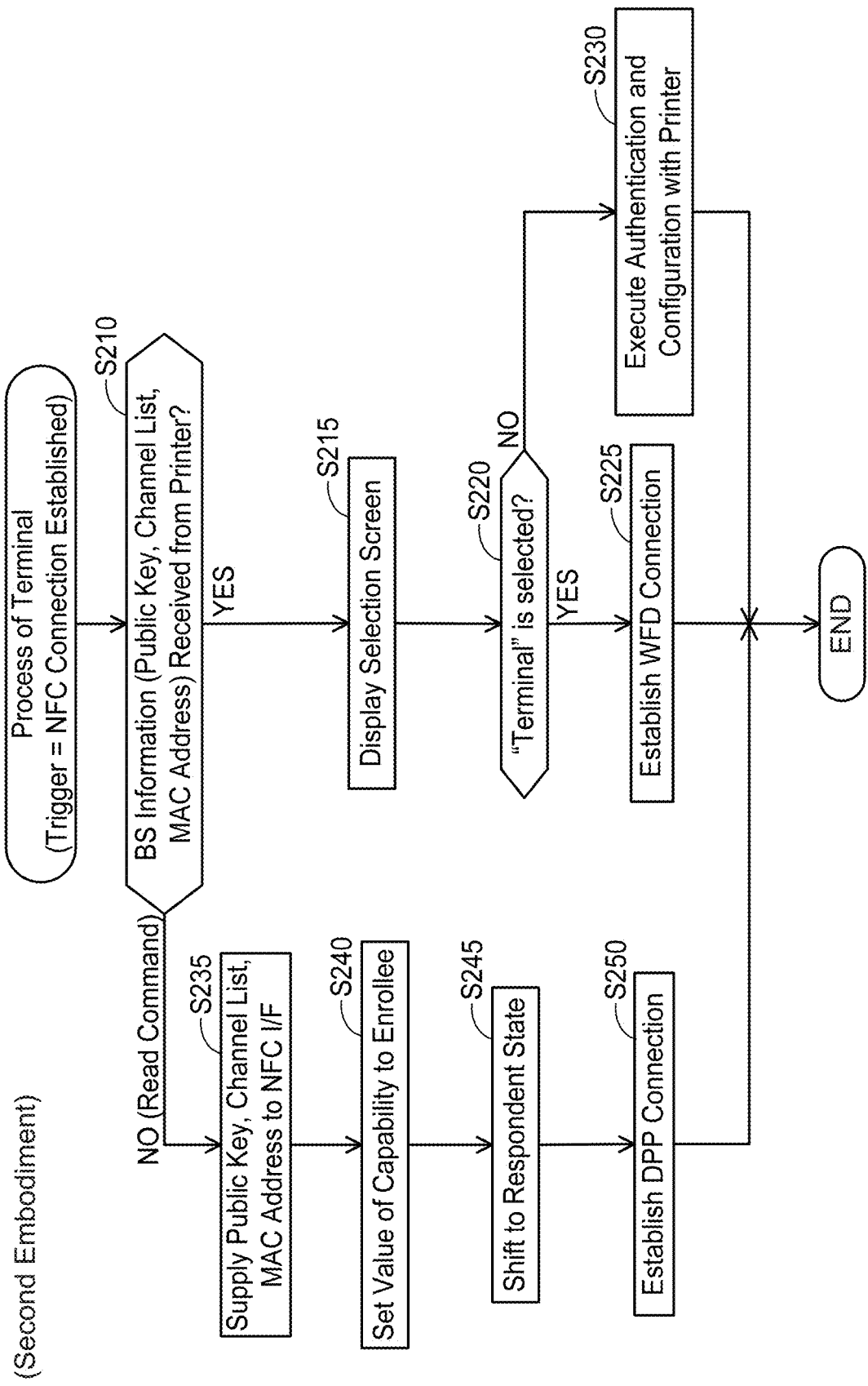
FIG. 12 shows a flowchart of a process executed by a terminal of a second embodiment.
Figure 13:
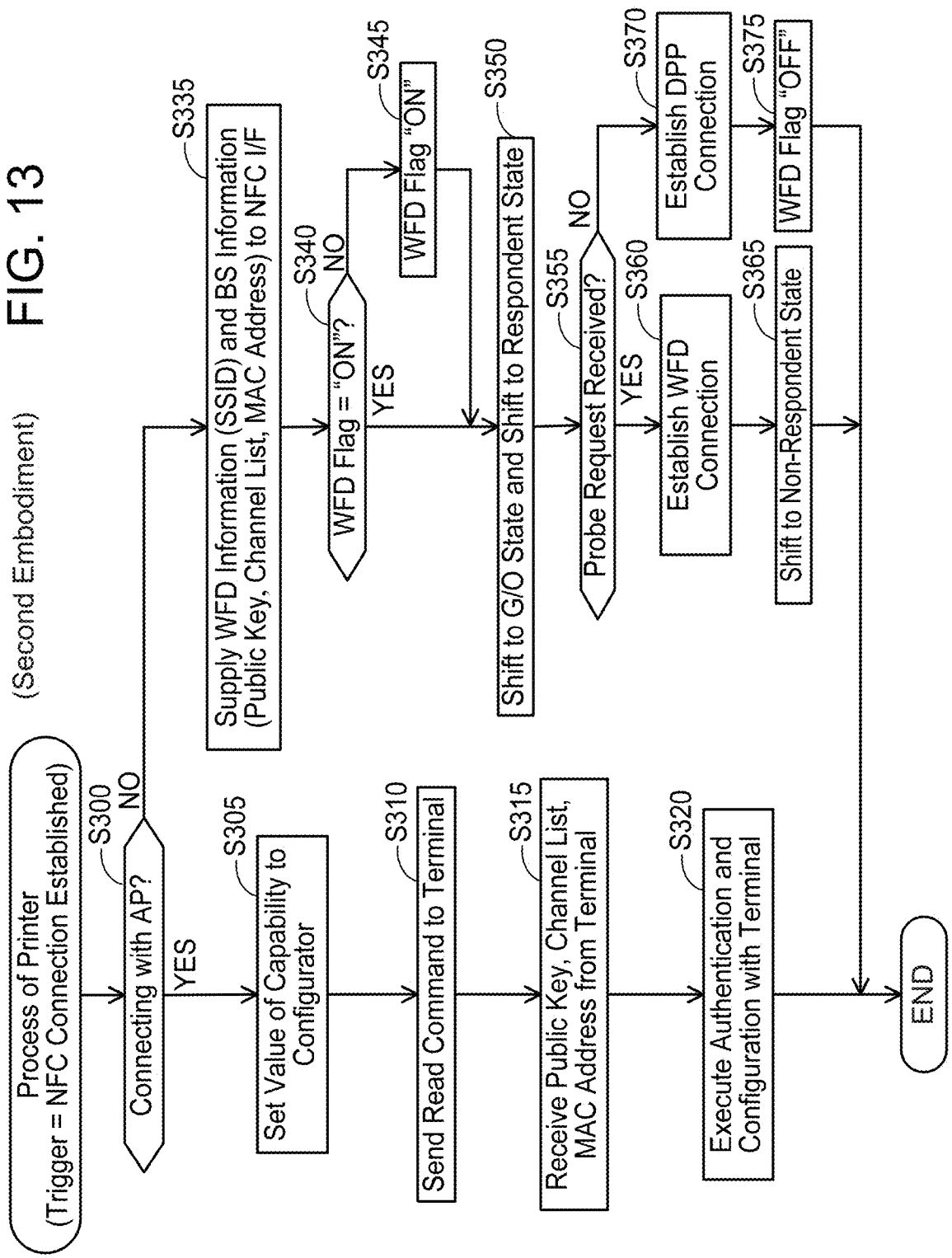
FIG. 13 shows a flowchart of a process executed by a printer of the second embodiment.

Second Embodiment; FIG. 12 and FIG. 13

Next, a second embodiment will be described with reference to FIGS. 12 and 13. The second embodiment differs from the first embodiment in that the terminal 10 executes the process of FIG. 12 instead of the process of FIG. 10, and the printer 100 executes the process of FIG. 12 instead of the process of FIG. 11. Firstly, the process executed by the CPU 32 of the terminal 10 will be described with reference to FIG. 12.

S210 is similar to S10 of FIG. 10. In a case of receiving the WFD information and the BS information from the printer 100, the terminal 10 determines YES in S210, and proceeds to S215. S215 to S230 are similar to S15 to S30 of FIG. 10. On the other hand, in a case of receiving a Read Command according to the NFC scheme from the printer 100, the terminal 10 determines NO in S210, and proceeds to S235.

In S235, the terminal 10 supplies, to the NFC I/F 18, the public key of the terminal 10, the channel list indicating the plurality of communication channels determined in advance in the terminal 10 (that is, the plurality of communication channels that can be used by the terminal 10), and the MAC address of the terminal 10. As a result, the NFC I/F 18 sends the public key, the channel list, and the MAC address to the printer 100 by using the established NFC connection.

In S240, the terminal 10 changes a value of the capability of the terminal 10 from a value indicating that the terminal 10 is capable of operating as the Configurator to a value indicating that the terminal 10 is capable of operating as the Enrollee.

In S245, the terminal 10 shifts from a non-respondent state to a respondent state. That is, the terminal 10 starts a process of monitoring receipt of an AReq using one communication channel among the plurality of communication channels in the channel list.

In S250, firstly, the terminal 10 executes the Auth and the Config with the printer 100. In the Auth, the terminal 10 receives the AReq from the printer 100, sends an ARes to the printer 100, receives the Confirm from the printer 100, and determines to operate as the Enrollee. Further, in the Config, the terminal 10 sends a CReq to the printer 100, receives a CRes including a CO for terminal from the printer 100, and stores the CO for terminal for establishing a DPP connection between the terminal 10 and the AP 6. Next, by using the CO for terminal, the terminal 10 executes the NA with the AP 6, shares, with the AP 6, a connection key for establishing a DPP connection with the AP 6, executes a 4 way-handshake with the AP 6, and establishes a DPP connection with the AP 6. When the process of S250 is completed, the process of FIG. 12 is terminated.

(Process of Printer; FIG. 13)

Next, a process executed by the CPU 132 of the printer 100 will be described with reference to FIG. 13. S300 is similar to S100 of FIG. 11. The printer 100 proceeds to S305 in a case of determining that a normal Wi-Fi connection with the AP 6 is being established (YES in S300). On the other hand, the printer 100 proceeds to S335 in a case of determining that a normal Wi-Fi connection with the AP 6 is not being established (NO in S300). S335 to S375 are similar to S135 to S175 of FIG. 11.

In S305, the printer 100 changes a value of the capability of the printer 100 from the value indicating that the printer 100 is capable of operating as the Enrollee to the value indicating that the printer 100 is capable of operating as the Configurator.

In S310, the printer 100 causes the NFC I/F 118 to send a Read Command. As a result, the NFC I/F 118 sends the Read Command to the terminal 10 by using the established NFC connection.

In S315, the printer 100 receives the public key, the channel list, and the MAC address of the terminal 10 from the terminal 10 via the NFC I/F 118.

In S320, the printer 100 executes the Auth and the Config with the terminal 10. In the Auth, the printer 100 sends an AReq to the terminal 10, receives an ARes from the terminal 10, sends the Confirm to the terminal 10, and determines to operate as the Configurator. Further, in the Config, the printer 100 receives a CReq from the terminal 10, creates a CO for terminal, and sends a CRes including the CO for terminal to the terminal 10. When the process of S320 is completed, the process of FIG. 13 is terminated.

Effect of the Present Embodiment

In this embodiment, in a case of determining that a normal Wi-Fi connection with the AP 6 is being established (YES in S300), the printer 100 sends a Read Command to the terminal 10 via the NFC I/F 118 (S310), receives the public key, the channel list, and the MAC address of the terminal 10 from the terminal 10 (S315), executes the Auth and the Config with the terminal 10 via the Wi-Fi I/F 116, and sends the CO for terminal to the terminal 10 (S320). As a result, the terminal 10 can receive the CO for terminal from the printer 100, execute an NA with the AP 6 by using the CO for terminal, and execute a 4 way-handshake with the AP 6 to establish a DPP connection with the AP 6. Due to this, the printer 100 becomes capable of executing communication with the terminal 10 via the AP 6.

Correspondence Relationship

The public key of the terminal 10 of S315 of FIG. 13 is an example of "a second public key". The AReq sent from the printer 100 to the terminal 10 and the ARes sent from the terminal 10 to the printer 100 in the Auth of S320 are an example of "a second authentication request", "a second authentication response", respectively. The CO for terminal is an example of "second connection information".

(Variant 1) In T35 of FIG. 2, the process of NA may be executed between the terminal 10 and the printer 100 to establish a DPP connection between the terminal 10 and the printer 100. That is, "a second external device" may be the same device as the "first external device".

(Variant 2) In the above embodiments, the terminal 10 is used to establish a DPP connection between the printer 100 and the AP 6. Alternatively, for example, the terminal 10 may be used to establish a DPP connection between the printer 100 and another device operating as the G/O (that is, a device operating as a parent station). Further, for example, the terminal 10 may be used to establish a DPP connection between the printer 100 operating as the G/O (that is, a device operating as a parent station) and another device (that is, a device operating as a child station). That is, the "second external device" may not be "an access point".

(Variant 3) The terminal 10 and the printer 100 may further comprise a BT I/F for executing a wireless communication according to the Bluetooth (registered trademark, hereinbelow termed simply as "BT") scheme. The above BT scheme includes BT scheme version 4.0 and above (so-called Blue Tooth Low Energy). In this case, for example, in T105 of FIG. 3, the printer 100 supplies, instead of the WFD information, BT information for establishing a wireless connection according to the BT scheme (hereinbelow termed simply as "BT connection") to the NFC I/F 118. As a result, the NFC I/F 118 sends the BT information and the BS information to the terminal 10 by using the NFC connection. In a case of receiving the BT information and the BS information from the printer 100, the terminal 10 causes the display unit 14 to display a selection screen in response to the "terminal" button being selected in the selection screen, and establishes a BT connection with the printer 100 by using the received BT information. In the present variant, the BT I/F of the terminal 10 is an example of "a third wireless interface" of the "first external device", and the BT I/F of the printer 100 is an example of "a third wireless interface" of the "communication device". Further, the BT scheme, and the BT connection are an example of "a second connection scheme", "a third wireless connection", respectively.

(Variant 4) The printer 100 may also operate in the setting mode in a case where a normal Wi-Fi connection with the AP 6 is established. In the present variant, "shift the operation mode of the communication device from a first mode to a second mode", "supply the specific information and determination information to the first wireless interface" may be omitted.

(Variant 5) The process of S165 of FIG. 11 (or S365 of FIG. 13) may be omitted. In the present variant, "shift the operation state of the communication device from the respondent state to the non-respondent state" may be omitted.

(Variant 6) The process of S15 of FIG. 10 (or S215 of FIG. 12) may be omitted. In this case, in a case of receiving the WFD information and the BS information from the printer 100, the terminal 10 may determine whether the public key TPK2 and the secret key tsk2 are being stored in the memory 34, that is, may determine whether the Config with the AP 6 has been executed. In case of determining that the Config with the AP 6 has been executed, the terminal 10 executes the Auth and the Config with the printer 100 in S30. On the other hand, in case of determining that the Config with the AP 6 has not been executed, the terminal 10 establishes a WFD connection with the printer 100 in S25. In the present variant, the case of determining that the Config with the AP 6 has been executed is an example of "a case where it is determined that the second wireless connection is to be established", and the case of determining that the Config with the AP 6 has not been executed is an example of "a case where it is determined that the third wireless connection is to be established".

(Variant 7) In S105 of FIG. 11, the printer 100 may supply the MAC address of the printer 100, instead of the AP information, to the NFC I/F 118. In a case of receiving the WFD information and the MAC address from the printer 100 via the NFC I/F 18, the terminal 10 determines that the BS information has not been received from the printer 100 (NO in S10 of FIG. 10) and, in S35, determines whether communication with the printer 100 is currently possible by using the received MAC address. Specifically, the terminal 10 firstly determines whether a normal Wi-Fi connection with the AP 6 has been established. In a case of determining that a normal Wi-Fi connection with the AP 6 has not been established, the terminal 10 determines NO in S35, and proceeds to S25. On the other hand, in a case of determining that a normal Wi-Fi connection with the AP 6 has been established, the terminal 10 sends a request signal by broadcast via the Wi-Fi I/F 16 by using the AP 6. In response to the sending of the request signal by broadcast, the terminal 10 receives respective response signals to the request signal from each of the one or more devices connected to the AP 6. In this case, the terminal 10 determines whether a response signal including the received MAC address of the printer 100 is included in the one or more response signals. In a case of determining that the response signal including the MAC address of the printer 100 is included in the one or more response signals, the terminal 10 determines YES in S35, and proceeds to S40. On the other hand, in a case of determining that the response signal including the MAC address of the printer 100 is not included in the one or more response signals, the terminal 10 determines NO in S35, and proceeds to S25. In the present variant, the MAC address of the printer 100 is an example of the "determination information".

(Variant 8) In the above embodiments, the terminal 10 executed each process according to the app 38, but may execute the following processes according to the OS program 36. That is, the terminal 10 establishes an NFC connection with the printer 100, and receives the WFD information and the BS information from the printer 100 via the NFC I/F 18 according to the OS program 36. In this case, the terminal 10 determines whether the app 38 has been activated. In a case of determining that the app 38 has not been activated, the terminal 10 determines that a DPP connection is to be established between the printer 100 and the AP 6, and executes the same processes as in FIG. 4 and FIG. 5. On the other hand, in a case of determining that the app 38 has been activated, the terminal 10 determines that a WFD connection is to be established between the terminal 10 and the AP 6, and executes the same processes as in T522 and T530 of FIG. 7. In the present variant, also, in the case of receiving an AReq from the terminal 10, the printer 100 can send an ARes to the terminal 10, receive a CRes including the CO for printer from the terminal 10, and establish a DPP connection with the AP 6 by using the CO for printer. On the other hand, in the case of receiving a PReq including the SSID "wfd" from the terminal 10, the printer 100 can establish a WFD connection with the terminal 10. As such, in response to the establishment of the NFC connection between the printer 100 and the terminal 10, the printer 100 can establish a DPP connection or WFD connection different from the NFC connection according to an appropriate connection scheme among the plurality of connection schemes.

(Variant 9) The process (for example, T202, T212 of FIG. 4) for creating the shared key (for example, SK1) is not limited to the process described above according to the ECDH, but may be another process according to the ECDH. Further, the process for creating the shared key is not limited to processes according to the ECDH, and a process according to another scheme (for example, DH (Diffie-Hellman key exchange), etc.) may be executed. Further, in the above embodiments, the digital signatures DSap and DSpr were created according to ECDSA, but may be created according to another scheme (for example, DSA (Digital Signature Algorithm), RAS (Rivest-Shamir-Adleman cryptosystem) etc.).

(Variant 10) Instead of the NFC I/F 18, the terminal 10 may comprise a different wireless interface according to a wireless scheme different from the NFC scheme (for example, BT scheme, TransferJet scheme). In this case, the printer 100 may also comprise, instead of the NFC I/F 118, a different wireless interface according to the wireless scheme different from the NFC scheme. For example, in T110 of FIG. 3 the printer 100 sends the WFD information and the BS information to the terminal 10 via that wireless interface. In the present variant, the different wireless interface according to the wireless scheme different from the NFC scheme is an example of the "first wireless interface".

(Variant 11) For example, instead of operating as the G/O of the WFD scheme, the printer 100 may operate as a so-called Soft AP. In this case, for example, in T105 of FIG. 3, the printer 100 creates an SSID and password used in the wireless network in which the printer 100 operates as the Soft AP, and supplies Soft AP information including the SSID and password to the NFC I/F 118. As a result, in T110, the NFC I/F 118 sends the Soft AP information and the BS information to the NFC I/F 18 by using the established NFC connection. In the present variant, the SSID in the Soft AP information is an example of the "specific information".

(Variant 12) In the case of determining NO in S155 of FIG. 11 (or S355 of FIG. 13), that is, in the case of receiving an AReq from the terminal 10 via the Wi-Fi I/F 116 (for example, T210 of FIG. 4), the printer 100 may change the WFD flag from "ON" to "OFF" before executing the process of S170. In this case, when the process of S170 (or S370) ends, the printer 100 terminates the process of FIG. 11 (or FIG. 13). In a situation where an AReq is received from the terminal 10, the possibility is low of a communication according to the WFD scheme being executed between the terminal 10 and the printer 100. In such a situation, since the printer 100 changes the WFD flag from "ON" to "OFF", it is possible to suppress a state in which the WFD flag indicates "ON", that is, to suppress maintenance of a state in which the printer 100 can operate according to the WFD scheme.

(Variant 13) The "communication device" may not be a printer, but may be another device such a scanner, a multi-function peripheral, a portable terminal, a PC, a server, etc.

(Variant 14) In each of the above embodiments, the respective processes of FIGS. 2 to 13 are implemented by software (that is, the app 38, the program 136). Instead of this, one or more of the processes may be implemented by hardware such as a logic circuit.

What is claimed is:

1. A communication device comprising:
   one or more wireless interfaces;
   a processor; and
   a memory storing computer-readable instructions therein, the computer-readable instructions, when executed by the processor, causing the communication device to:
   accept a predetermined operation;
   in a case where the predetermined operation is accepted, shift an operation state of the communication device from a non-respondent state to a respondent state and from a non-capable state to a capable state, the non-respondent state being a state of not sending an authentication response to a first external device even when an authentication request is received from the first external device, the respondent state being a state of sending the authentication response to the first external device in response to receiving the authentication request from the first external device, the non-capable state being a state incapable of operating according to a second connection scheme different from a first connection scheme, and the capable state being a state capable of operating according to the second connection scheme;

in a case where the operation state of the communication device is the respondent state and the authentication request is received from the first external device via a first wireless interface among the one or more wireless interfaces:
- send the authentication response to the first external device via the first wireless interface;
- receive first connection information from the first external device via the first wireless interface after the authentication response has been sent to the first external device, the first connection information being for establishing a first wireless connection between the communication device and a second external device via the first wireless interface; and
- in a case where the first connection information is received from the first external device, establish, according to the first connection scheme, the first wireless connection between the communication device and the second external device via the first wireless interface by using the first connection information; and in a case where the operation state of the communication device is the capable state and a specific signal based on specific information is received from the first external device via a second wireless interface among the one or more wireless interfaces,
- shift to a state capable of communicating with the first external device via the second wireless interface according to the second connection scheme different from the first connection scheme.

2. The communication device as in claim 1, wherein the predetermined operation is an operation for establishing a second wireless connection according to a third connection scheme between the communication device and the first external device.

3. The communication device as in claim 1, wherein the first connection scheme is a connection scheme according to a Device Provisioning Protocol (DPP) scheme.

4. The communication device as in claim 1, further comprising
an output unit,
wherein the computer-readable instructions, when executed by the processor, further cause the communication device to:
cause the output unit to output a public key that is a public key of the communication device and the specific information, wherein the public key and the specific information are acquired by a first external device due to the public key and the specific information being outputted, the public key is used in the authentication request, and the specific signal is based on the specific information.

5. The communication device as in claim 4, wherein
after the operation state of the communication device has been shifted from the non-respondent state to the respondent state and from the non-capable state to the capable state, the output unit is caused to output the public key and the specific information.

6. The communication device as in claim 1, wherein
the computer-readable instructions, when executed by the processor, further cause the communication device to:
after the operation state of the communication device has been shifted from the non-respondent state to the respondent state and from the non-capable state to the capable state, operate as a parent station of the second connection scheme.

\* \* \* \* \*